(12) United States Patent
Kang et al.

(10) Patent No.: US 7,505,209 B2
(45) Date of Patent: Mar. 17, 2009

(54) FIXED-FOCUS LENS

(75) Inventors: Yi-Hao Kang, Hsinchu (TW); Chao-Yi Yeh, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/684,798

(22) Filed: Mar. 12, 2007

(65) Prior Publication Data

US 2007/0268598 A1 Nov. 22, 2007

(30) Foreign Application Priority Data

May 18, 2006 (TW) .............................. 95117609 A

(51) Int. Cl.
G02B 3/00 (2006.01)
G02B 9/00 (2006.01)
G02B 13/04 (2006.01)

(52) U.S. Cl. .................... 359/649; 359/749; 359/751

(58) Field of Classification Search ................. 359/726, 359/649, 689, 751, 754, 755, 784, 749, 750, 359/708

See application file for complete search history.

(56) References Cited

U.S. PATENT DOCUMENTS

| 4,306,776 | A | 12/1981 | Someya ...................... 350/427 |
| 4,576,444 | A | 3/1986 | Kawamura .................. 350/428 |
| 6,144,503 | A | 11/2000 | Sugano |
| 6,275,343 | B1 | 8/2001 | Takamoto et al. ........... 359/749 |
| 6,392,826 | B2 | 5/2002 | Hayashi et al. .............. 359/823 |
| 6,466,379 | B2 | 10/2002 | Nakane ...................... 359/699 |
| 6,471,359 | B1 | 10/2002 | Kim et al. |
| 6,542,316 | B2 | 4/2003 | Yoneyama |
| 6,765,731 | B1 | 7/2004 | Cannon |
| 7,230,770 | B2* | 6/2007 | Kreitzer et al. .............. 359/649 |
| 2003/0137744 | A1* | 7/2003 | Kuwa et al. ................. 359/649 |

FOREIGN PATENT DOCUMENTS

| JP | 10-221733 | 8/1998 |
| TW | I232315 | 5/2005 |
| TW | I243914 | 11/2005 |

* cited by examiner

Primary Examiner—Alicia M Harrington
(74) Attorney, Agent, or Firm—J.C. Patents

(57) ABSTRACT

A fixed-focus lens suitable for projecting an image beam from a light valve onto a screen is provided. The fixed-focus lens comprises a first lens group, a second lens group, and a third lens group arranged in sequence. The third lens group is disposed near the light valve. The first lens group having a negative refractive power comprises at least an aspheric lens. The second lens group having a positive refractive power comprises at least a lens. The third lens group having a positive refractive power comprises at least four lenses.

4 Claims, 24 Drawing Sheets

FIXED-FOCUS LENS

CROSS-REFERENCE TO RELATED APPLICATION

This application claims the priority benefit of Taiwan application serial no. 95117609, filed May 18, 2006. All disclosure of the Taiwan application is incorporated herein by reference.

BACKGROUND OF THE INVENTION

1. Field of Invention

The present invention relates to a lens. More particularly, the present invention relates to a fixed-focus lens.

2. Description of Related Art

With the progress of modern video technology, image projection devices such as digital light processing (DLP) projectors and liquid crystal on silicon (LCOS) projectors are widely applied. One of the core elements in the projectors is a projection lens, which is used to project images on screens. Therefore, the quality of images is closely related to the optical quality of the projection lens. In the highly competitive market, manufacturers are all devoted to improving the quality of projection lenses and reducing the manufacturing cost, so as to improve the competitive edge of the image projection devices.

Referring to FIG. 1, a conventional projection lens 100 comprises a first lens group 110, a second lens group 120, and a third lens group 130 arranged in sequence, wherein the third lens group 130 is near a light valve 50. The first lens group 110 comprises four lenses 112, the second lens group 120 comprises one lens 122, and the third lens group comprises six lenses 132.

As the conventional projection lens 100 uses a relatively large number of lenses, the manufacturing cost is high. In addition, the projection lens 100 has a large length as many lenses are used. Therefore, a rear projection television (RPTV) using the projection lens 100 is normally thick. If the thickness of the RPTV is reduced, the aberration during optical imaging becomes serious and even problems such as ghost images occurs, which cause the degradation of the imaging quality.

SUMMARY OF THE INVENTION

An objective of the present invention is to provide a fixed-focus lens, so as to improve the imaging quality.

To achieve the aforementioned and other objectives, the present provides a fixed-focus lens suitable for projecting an image beam from a light valve onto a screen. The fixed-focus lens comprises a first lens group, a second lens group, and a third lens group arranged in sequence, wherein the third lens group is near the light valve. The first lens group has a negative refractive power and comprises at least an aspheric lens. The second lens group has a positive refractive power and comprises at least a lens. The third lens group has a positive refractive power and comprises at least four lenses. Furthermore, the shortest distance between the first lens group and the second lens group is $S_{1-2}$, the effective focal length of the third lens group is $F_3$, and $S_{1-2}/F_3>1.5$. The effective focal length of the lens closest to the screen in the first lens group is $F_{11}$, the effective focal length of the fixed-focus lens is F, and $F_{11}/F<-18.5$.

The present invention further provides another fixed-focus lens suitable for projecting an image beam from a light valve onto a screen. The fixed-focus lens comprises a first lens group, a second lens group, a third lens group, and a fourth lens group arranged in sequence, wherein the fourth lens group is near the light valve. The first lens group has a negative refractive power, and comprises at least an aspheric lens. The second lens group has a positive refractive power and comprises at least a lens. The third lens group has a positive refractive power and comprises at least a lens. The fourth lens group has a positive refractive power and comprises at least four lenses. Furthermore, the shortest distance between the first lens group and the second lens group is $S_{1-2}$, the effective focal length of the third lens group and the fourth lens group is $F_{34}$, and $S_{1-2}/F_{34}>0.75$. The distance between the second lens group and the third lens group is $S_{2-3}$, the effective focal length of the fixed-focus lens is F, and $S_{2-3}/F>9.05$.

The present invention further provides another fixed-focus lens suitable for projecting an image beam from a light valve onto a screen. The fixed-focus lens comprises a first lens group, a second lens group, and a third lens group arranged in sequence, wherein the third lens group is near the light valve. The first lens group has a negative refractive power and comprises at least an aspheric lens and a lens with a positive refractive power. The second lens group has a positive refractive power and comprises at least a lens. The third lens group has a positive refractive power and comprises at least five lenses. Furthermore, the shortest distance between the first lens group and the second lens group is $S_{1-2}$, the effective focal length of the third lens group is $F_3$, and $S_{1-2}/F_3>1.51$.

In the fixed-focus lens of the present invention, the lens groups have negative and positive refractive powers matched together to effectively eliminate the aberration. Furthermore, since the first lens group comprises an aspheric lens, the serious aberration caused by a wide-angle incident light is effectively corrected. Moreover, the fixed-focus lens of the present invention is an L-shaped lens, thus greatly reducing the length, and an RPTV using the fixed-focus lens of the present invention becomes thinner.

Other objectives, features and advantages of the present invention will be further understood from the further technology features disclosed by the present invention wherein there are shown and described preferred embodiments of this invention, simply by way of illustration of modes best suited to carry out the invention.

DESCRIPTION OF EMBODIMENTS

The First Embodiment

Figure 2:
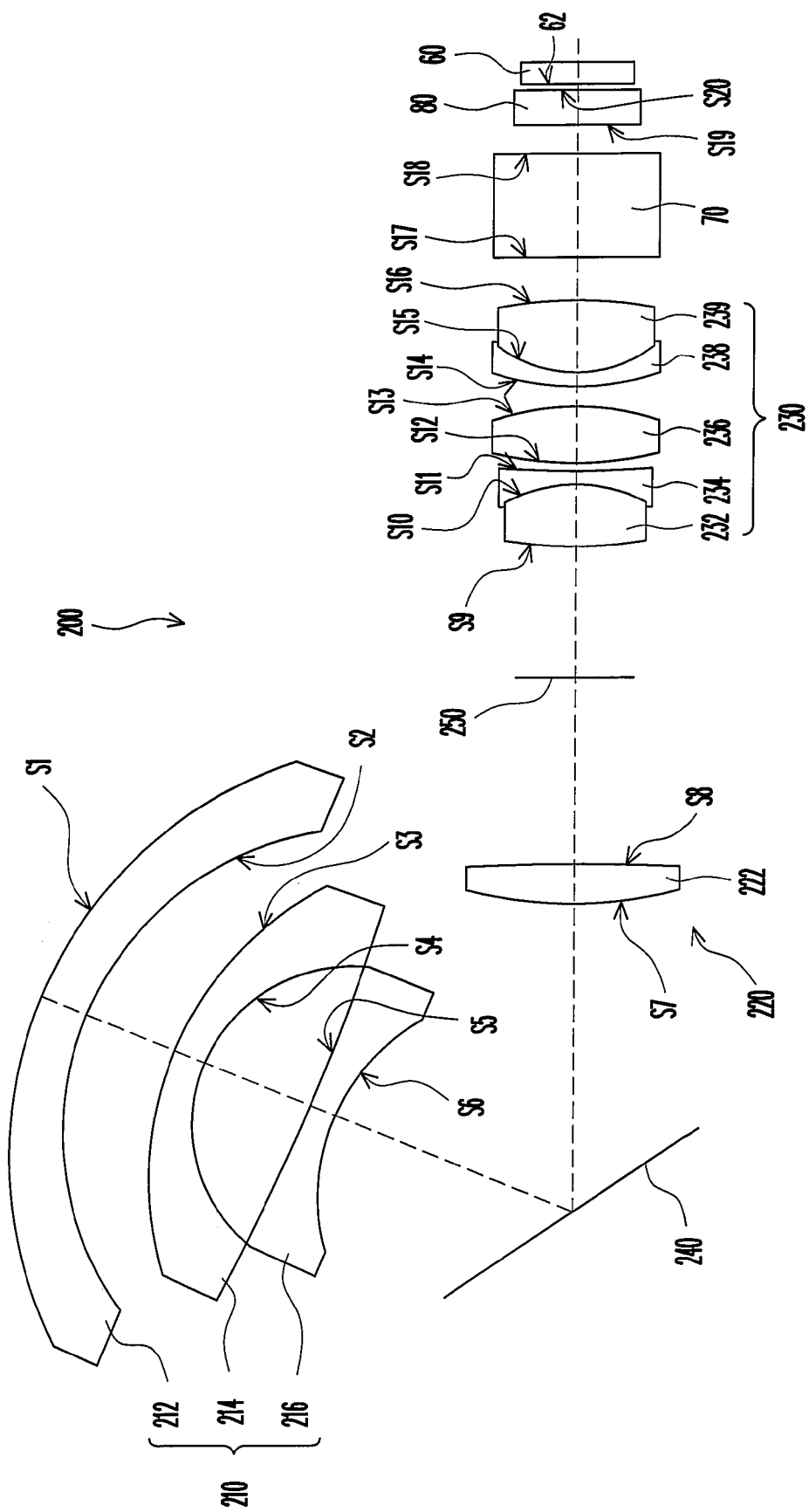
FIG. 2 is a schematic structure view of a fixed-focus lens according to the first embodiment of the present invention.

Referring to FIG. 2, a fixed-focus lens 200 of the present embodiment is suitable for projecting an image beam from a light valve 60 onto a screen (not shown). The fixed-focus lens 200 comprises a first lens group 210, a second lens group 220, and a third lens group 230 arranged in sequence, wherein the third lens group 230 is near the light valve 60. The first lens group 210 has a negative refractive power and comprises at least an aspheric lens, the second lens group 220 has a positive refractive power and comprises at least a lens, and the third lens group 230 has a positive refractive power and comprises at least four lenses. This combination effectively eliminates the aberration and color difference.

In detail, the aforementioned first lens group 210 comprises a first lens 212, a second lens 214, and a third lens 216 arranged in sequence, wherein the third lens 216 is near the second lens group 220, and the first lens 212 is an aspheric lens. The first lens 212, the second lens 214, and the third lens 216 all have negative refractive powers. In addition, the second lens group 220 has a fourth lens 222 with a positive refractive power. The third lens group 230 comprises a fifth lens 232, a sixth lens 234, a seventh lens 236, an eighth lens 238, and a ninth lens 239 arranged in sequence, wherein the fifth lens 232 is near the second lens group 220. The refractive powers of the fifth lens 232, the sixth lens 234, the seventh lens 236, the eighth lens 238, and the ninth lens 239 are respectively positive, negative, positive, negative, and positive.

In the present embodiment, a reflective element 240, such as a reflecting mirror, is disposed between the first lens group 210 and the second lens group 220, such that the fixed-focus lens 200 becomes an L-shaped lens. Thus, the length of the fixed-focus lens 200 is effectively reduced, and a rear projection television (RPTV) using the fixed-focus lens 200 becomes thinner. Moreover, an aperture 250 is disposed, for example, between the second lens group 220 and the third lens group 230.

Figure 1:
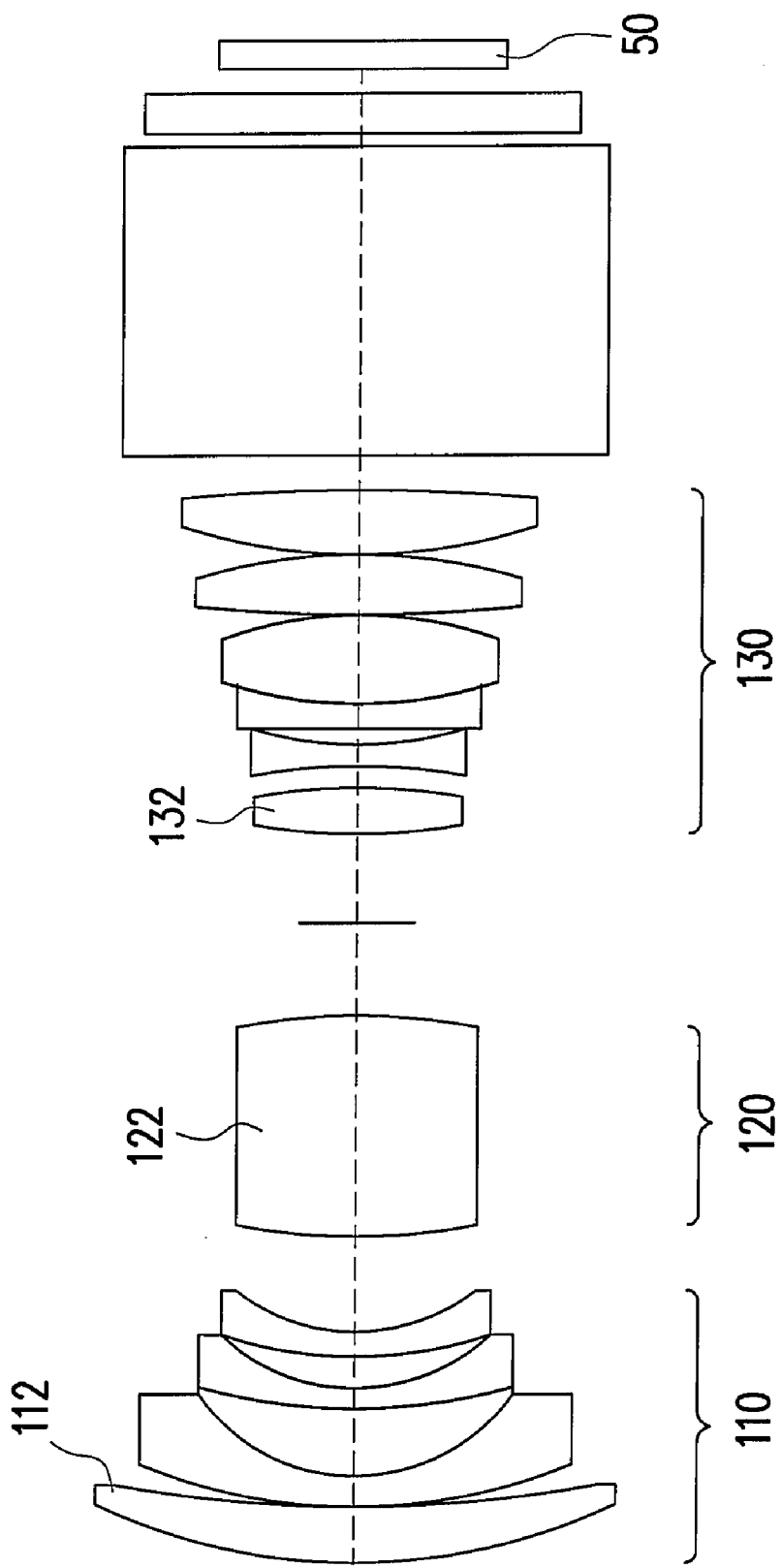
FIG. 1 is a schematic structure view of a conventional projection lens.

As the first lens 212 is an aspheric lens, the serious aberration caused by the wide-angle incident light is effectively corrected, and especially the improvement to distortions is obvious. In addition, the fixed-focus lens 200 of the present embodiment only comprises nine lenses. Compared with the projection lens 100 using eleven lenses according to the conventional art as shown in FIG. 1, the manufacturing cost of the fixed-focus lens 200 is lower. Furthermore, in the present embodiment, cheap plastic lenses are employed to further reduce the manufacturing cost of the fixed-focus lens 200.

In order to further assure the imaging quality of the fixed-focus lens 200, the limitation that $S_{1-2}/F_3 > 1.51$, and $F_{11}/F < -18.5$ is required in the present embodiment, wherein $S_{1-2}$ is the shortest distance between the first lens group 210 and the second lens group 220, i.e., the distance of the optical axis of the image beam being transmitted from the fourth lens 222 to the third lens 216. $F_3$ is the effective focal length of the third lens group 230, $F_{11}$ is the effective focal length of the lens closest to the screen in the first lens group 210 (i.e., the first lens 212), and F is the effective focal length of the fixed-focus lens 200. Moreover, in order to prevent the ghost images, D/h>0.176 is a limitation in the present embodiment, wherein D is the size of the light spot. Here, the light spot is formed on an active surface 62 of the light valve 60 when a part of the image beam from the light valve 60 is reflected back to the light valve 60 by any surface of the fixed-focus lens 200, and the size of the light spot is, for example, a micron size. "h" is the maximum distance from any point on the active surface 62 to the optical axis of the active surface 62. Generally speaking, the shape of the active surface 62 of the light valve 60 is rectangular, and h is the distance from the corner of the active surface 62 to the optical axis of the active surface 62.

A preferred embodiment of the fixed-focus lens 200 with the effective focal length (F) of 5.19 mm is illustrated as follows. However, the numerical values of this effective focal length and data listed in Tables 1 and 2 below are not intended to limit the present invention. Those skilled in the art can make appropriate modifications to the parameters or settings with reference to the present invention, and the modifications still fall within the scope of the present invention.

TABLE 1

| Surface | Radius of Curvature (mm) | Distance (mm) | Refractive Index | Abbe Number | Notes |
|---|---|---|---|---|---|
| S1 | 117.6608 | 4.0000 | 1.52 | 53 | the first lens |
| S2 | 35.6956 | 9.6716 | | | |
| S3 | 31.5627 | 3.2400 | 1.65 | 33.8 | the second lens |
| S4 | 15.7686 | 11.1842 | | | |
| S5 | −180.6161 | 2.7300 | 1.59 | 61.3 | the third lens |
| S6 | 20.6557 | 54.5687 | | | |
| S7 | 45.8669 | 3.7100 | 1.72 | 38 | the fourth lens |
| S8 | −194.5185 | 31.3991 | | | |
| S9 | 42.9152 | 5.7800 | 1.49 | 70.4 | the fifth lens |
| S10 | −12.6281 | 1.2400 | 1.81 | 33.3 | the sixth lens |
| S11 | 56.9428 | 1.0481 | | | |
| S12 | 30.9700 | 5.0600 | 1.69 | 31.2 | the seventh lens |
| S13 | −30.9700 | 2.1069 | | | |
| S14 | 23.3646 | 1.2100 | 1.76 | 27.5 | the eighth lens |
| S15 | 11.2029 | 7.5600 | 1.5 | 81.6 | the ninth lens |
| S16 | −41.3140 | 4.5000 | | | |
| S17 | Infinity | 10.0000 | 1.52 | 64.2 | prism |
| S18 | Infinity | 3.0000 | | | |
| S19 | Infinity | 3.0000 | 1.49 | 70.4 | protective cover |
| S20 | Infinity | 0.4800 | | | |

In Table 1, surfaces S1, S2 are two surfaces of the first lens 212, surfaces S3, S4 are two surfaces of the second lens 214, surfaces S5, S6 are two surfaces of the third lens 216, and surfaces S7, S8 are two surfaces of the fourth lens 222. Surface S9 is the surface of the fifth lens 232 away from the sixth lens 234, surface S10 is the surface connecting the sixth lens 234 and the fifth lens 232, and surface S11 is the surface of the sixth lens 234 away from the fifth lens 232. Surfaces S12, S13 are two surfaces of the seventh lens 236. Surface S14 is the surface of the eighth lens 238 away from the ninth lens 239, surface S15 is the surface connecting the ninth lens 239 and the eighth lens 238, and surface S16 is the surface of the ninth lens 239 away from the eighth lens 238. Surfaces S17, S18 are two surfaces of the prism 70, and surfaces S19, S20 are two surfaces of the protective cover 80 for protecting the light valve 60. Parameters of the radii of curvature and distances of various surfaces are listed in Table 1, and the details will not be repeated herein again.

The surfaces S1, S2 are aspheric surfaces, and are expressed by the following equation:

$$Z = \frac{cr^2}{1+\sqrt{1-(1+k)c^2r^2}} + A_1r^2 + A_2r^4 + A_3r^6 + A_4r^8 + \ldots$$

where Z is the offset of the direction of the optical axis, c is the reciprocal of the radius of the osculating sphere, i.e., the reciprocal of the radius of curvature near the optical axis (e.g., the radii of curvature of S1, S2 in the table above), k is the quadric coefficient, r is the aspheric height, i.e., the height from the center of the lens to the edge of the lens; and $A_1$, $A_2$, $A_3$, $A_4$ ... are aspheric coefficients, wherein $A_1$ is 0. Table 2 shows the parameters of the surfaces S1 and S2.

TABLE 2

| Aspheric Parameter | Conic Coefficient K | Coefficient $A_2$ | Coefficient $A_3$ | Coefficient $A_4$ | Coefficient $A_5$ |
|---|---|---|---|---|---|
| S1 | 8.7669 | 2.23926E−05 | −2.4159E−08 | 1.53738E−11 | −4.57973E−15 |
| S2 | −10.0254 | 4.71049E−05 | 4.4933E−08 | −8.23393E−12 | 1.82609E−14 |

Figure 3A:
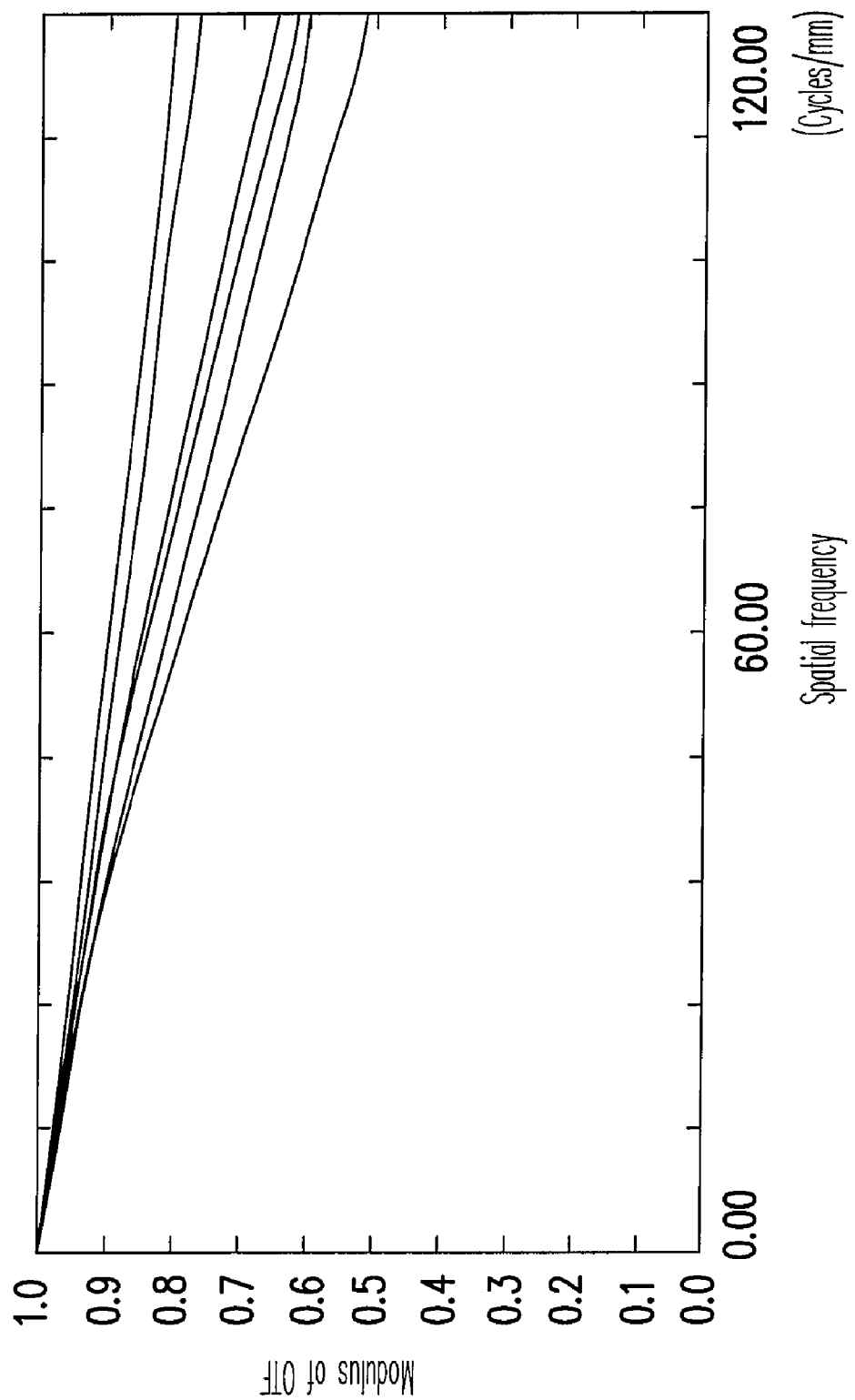
FIGS. 3A-3C are optical data diagrams of imaging of the fixed-focus lens according to the first embodiment of the present invention.
Figure 3B:
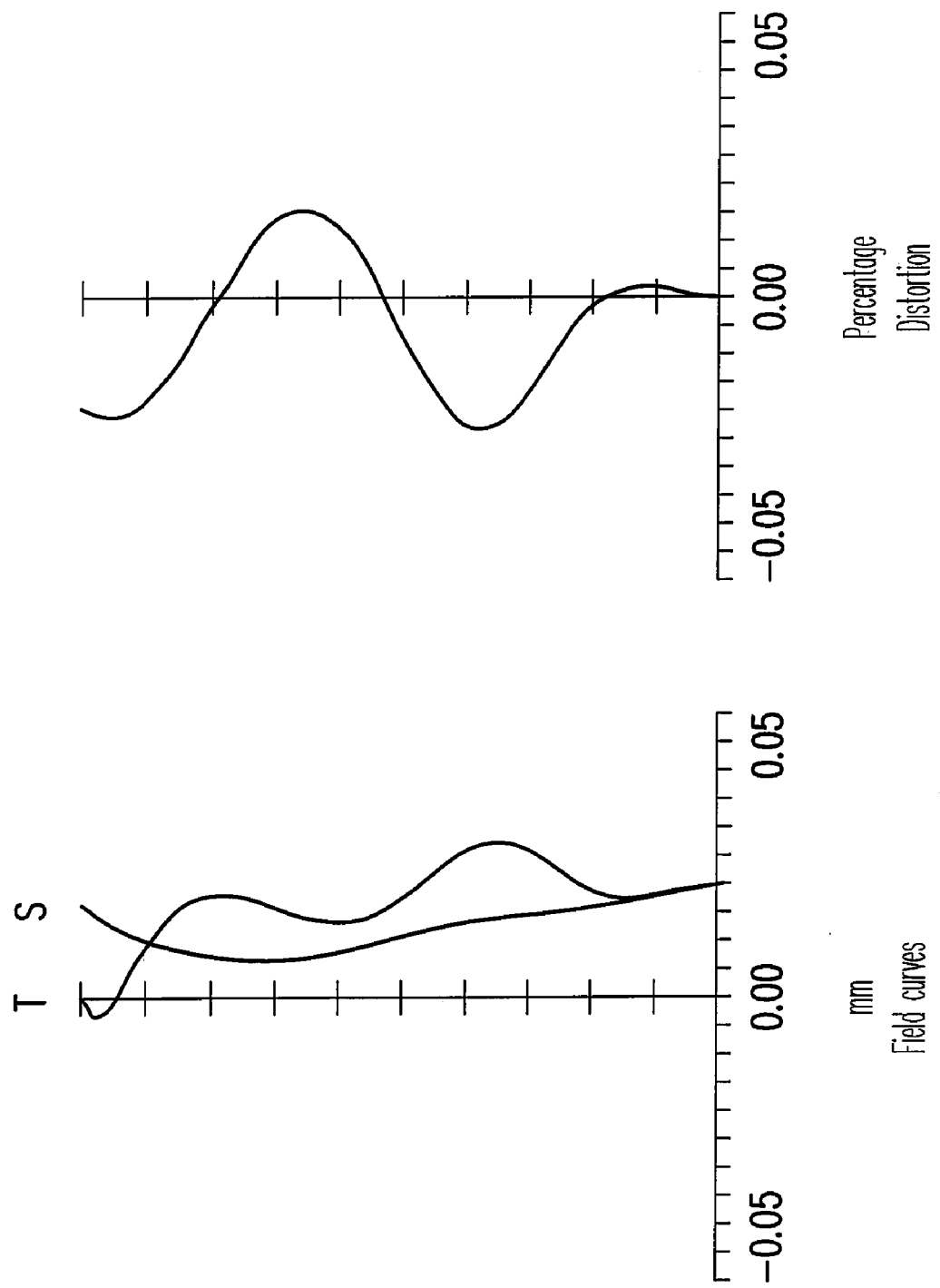
Figure 3C:
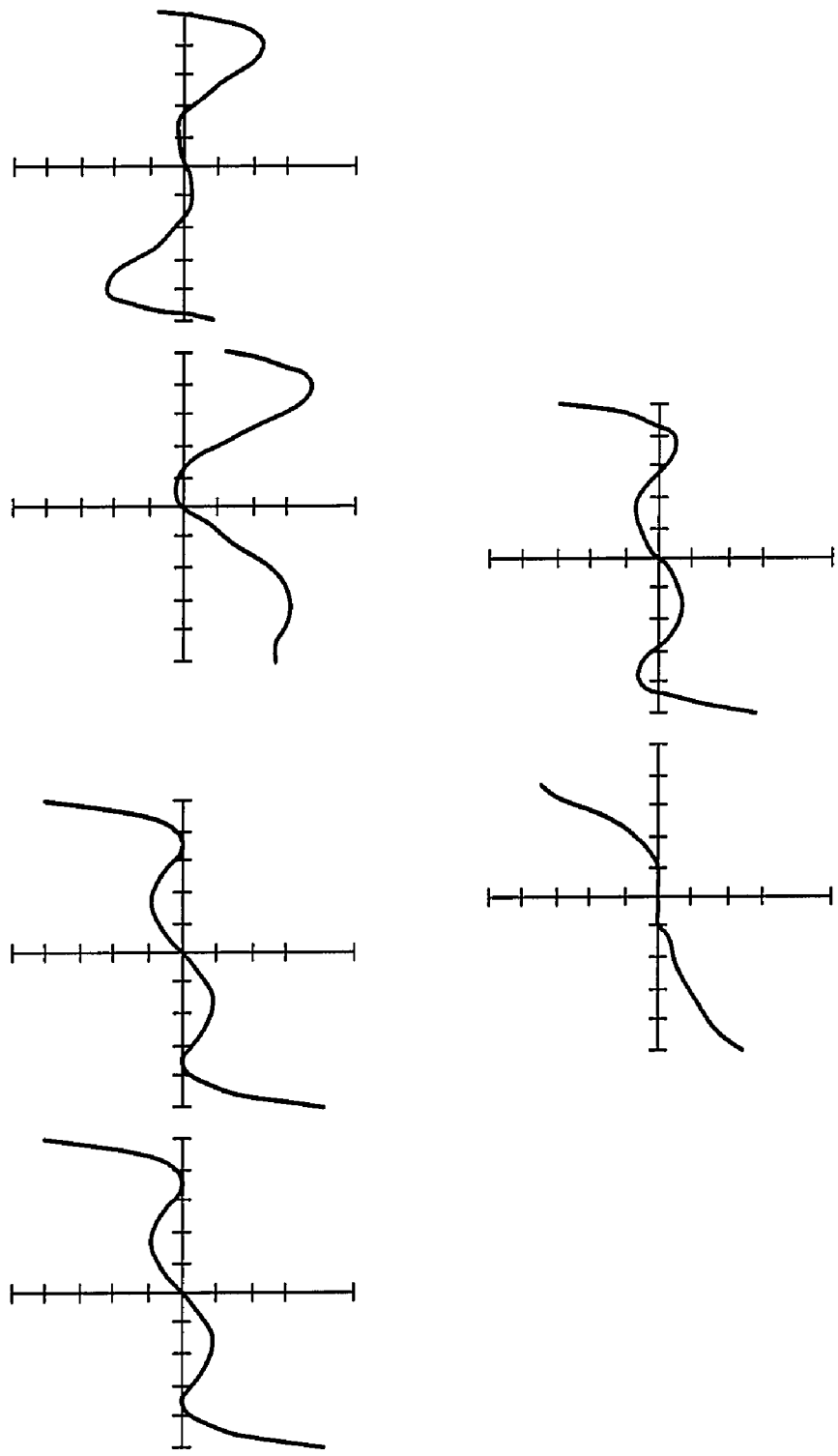

Referring to FIGS. 3A-3C, FIG. 3A is showing the modulation transfer function (MTF), wherein the horizontal axis is the spatial frequency in cycles per millimeter, and the vertical axis is the modulus of the optical transfer function (OTF). In FIG. 3A, when the spatial frequency is 50, the modulus of the OTF is still over 0.5, thus satisfying the specification of the standard. In addition, FIG. 3B is the field curve diagram and distortion diagram of images, and FIG. 3C is the transverse ray fan plot of images. Since graphics as shown in FIGS. 3B and 3C are within the scope of the standard, the fixed-focus lens 200 of the present embodiment has preferable optical quality.

The Second Embodiment

Figure 4:
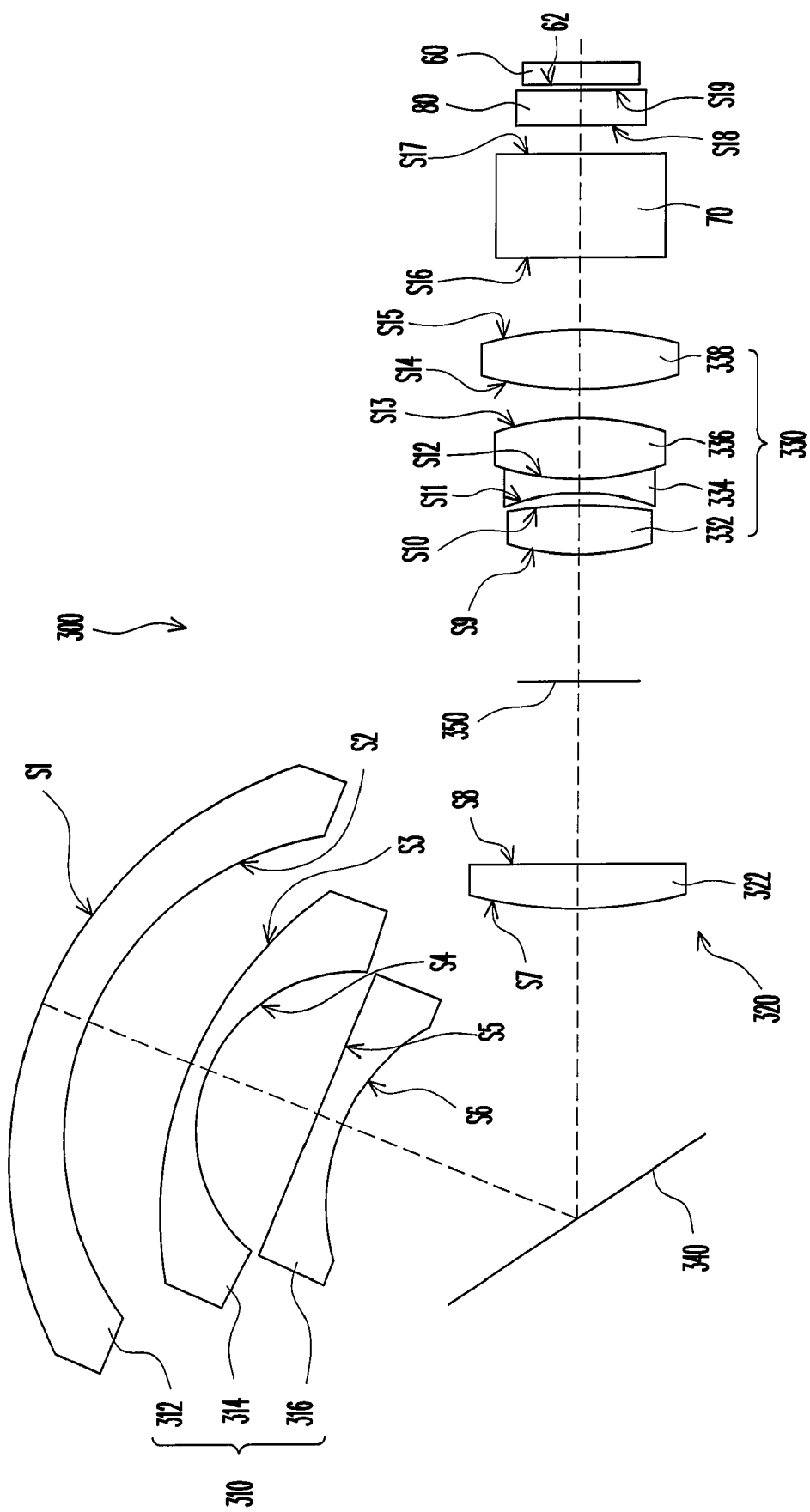
FIG. 4 is a schematic structure view of a fixed-focus lens according to the second embodiment of the present invention.

Referring to FIG. 4, the fixed-focus lens 300 of the present embodiment is suitable for projecting an image beam from a light valve 60 onto a screen (not shown). The fixed-focus lens 300 comprises a first lens group 310, a second lens group 320, and a third lens group 330 arranged in sequence, wherein the third lens group 330 is near the light valve 60. The first lens group 310 has a negative refractive power and comprises at least an aspheric lens, the second lens group 320 has a positive refractive power and comprises at least a lens, and the third lens group 330 has a positive refractive power and comprises at least four lenses. This combination effectively eliminates the aberration and color difference.

In detail, the aforementioned first lens group 310 comprises a first lens 312, a second lens 314, and a third lens 316 arranged in sequence, wherein the third lens 316 is near the second lens group 320, and the first lens 312 is an aspheric lens. The first lens 312, the second lens 314, and the third lens 316 all have negative refractive powers. In addition, the second lens group 320 has a fourth lens 322 with a positive refractive power. The third lens group 330 comprises a fifth lens 332, a sixth lens 334, a seventh lens 336, and an eighth lens 338 arranged in sequence, wherein the fifth lens 332 is near the second lens group 320. The refractive powers of the fifth lens 332, the sixth lens 334, the seventh lens 336, and the eighth lens 338 are positive, negative, positive, and positive respectively.

In the present embodiment, a reflective element 340 (e.g., a reflecting mirror) is disposed between the first lens group 310 and the second lens group 320, such that the fixed-focus lens 300 becomes an L-shaped lens. Thus, the length of the fixed-focus lens 300 is effectively reduced, and an RPTV using the fixed-focus lens 300 becomes thinner. Moreover, an aperture 350 is disposed, for example, between the second lens group 320 and the third lens group 330.

As the first lens 312 is an aspheric lens, the serious aberration caused by the wide-angle incident light is effectively corrected, and especially the improvement to distortions is obvious. In addition, the fixed-focus lens 300 of the present embodiment only comprises eight lenses. Compared with the projection lens 100 using eleven lenses according to the conventional art (as shown in FIG. 1), the manufacturing cost of the fixed-focus lens 300 is lower. Furthermore, in the present embodiment, cheap plastic lenses are used to further reduce the manufacturing cost of the fixed-focus lens 300.

In order to assure the imaging quality of the fixed-focus lens 300, the limitation that $S_{1-2}/F_3 > 1.51$, and $F_{11}/F < -18.5$ is required in the present embodiment, wherein $S_{1-2}$ is the shortest distance between the first lens group 310 and the second lens group 320, i.e., the distance of the optical axis of the image beam being transmitted from the fourth lens 322 to the third lens 316. Wherein $F_3$ is the effective focal length of the third lens group 330, $F_{11}$ is the effective focal length of the lens (i.e., the first lens 312) closest to the screen in the first lens group 310, and F is the effective focal length of the fixed-focus lens 300. Moreover, in order to prevent the ghost images, D/h>0.176 is a limitation in the present embodiment. Here, the meanings of D and h are the same as those of the first embodiment, thus the details will not be repeated herein again.

A preferred embodiment of the fixed-focus lens 300 with the effective focal length of 5.19 mm is illustrated as follows. However, the numerical values of this effective focal length and data listed Tables 3 and 4 below are not intended to limit the present invention. Those skilled in the art can make appropriate modifications to the parameters or settings with reference to the present invention, and the modifications still fall within the scope of the present invention.

TABLE 3

| Surface | Radius of Curvature (mm) | Distance (mm) | Refractive Index | Abbe Number | Notes |
|---|---|---|---|---|---|
| S1 | 205.0000 | 4.0000 | 1.52 | 52.1 | the first lens |
| S2 | 41.5317 | 9.8028 | | | |
| S3 | 58.3836 | 3.5000 | 1.62 | 58.1 | the second lens |
| S4 | 18.2744 | 10.4571 | | | |
| S5 | 357.4750 | 2.4000 | 1.49 | 70.4 | the third lens |
| S6 | 18.9214 | 61.3242 | | | |
| S7 | 38.2723 | 5.1000 | 1.81 | 33.3 | the fourth lens |
| S8 | −525.5819 | 23.7571 | | | |
| S9 | 24.5743 | 4.0000 | 1.49 | 70.4 | the fifth lens |
| S10 | −39.3351 | 0.9763 | | | |
| S11 | −22.2536 | 2.0000 | 1.85 | 23.8 | the sixth lens |

TABLE 3-continued

| Surface | Radius of Curvature (mm) | Distance (mm) | Refractive Index | Abbe Number | Notes |
|---|---|---|---|---|---|
| S12 | 15.2251 | 6.5000 | 1.5 | 81.6 | the seventh lens |
| S13 | −25.7044 | 3.8957 | | | |
| S14 | 30.9257 | 6.0000 | 1.67 | 32.2 | the eighth lens |
| S15 | −30.8029 | 3.0437 | | | |
| S16 | Infinity | 10.0000 | 1.52 | 64.2 | prism |
| S17 | Infinity | 4.5000 | | | |
| S18 | Infinity | 3.0000 | 1.49 | 70.4 | protective cover |
| S19 | Infinity | 0.4800 | | | |

In Table 3, surfaces S1, S2 are two surfaces of the first lens 312, surfaces S3, S4 are two surfaces of the second lens 314, surfaces S5, S6 are two surfaces of the third lens 316, surfaces S7, S8 are two surfaces of the fourth lens 322, and surfaces S9 and S10 are two surfaces of the fifth lens 232. Surface S11 is the surface of the sixth lens 334 away from the seventh lens 336, surface S12 is the surface connecting the seventh lens 336 and the sixth lens 334, and surface S13 is the surface of the seventh lens 336 away from the sixth lens 334. Surfaces S14, S15 are two surfaces of the eighth lens 238, surfaces S16, S17 are two surfaces of the prism 70, and surfaces S18, S19 are two surfaces of the protective cover 80 for protecting the light valve 60. The parameters of the radii of curvature and distances of various surfaces are listed in Table 3, and the details will not be repeated herein again.

The above surfaces S1, S2 are aspheric surfaces, and the parameters of the surfaces S1 and S2 are listed in Table 4. Moreover, the equation about aspheric surfaces is as described in the first embodiment.

TABLE 4

| Aspheric Parameter | Conic Coefficient K | Coefficient $A_2$ | Coefficient $A_3$ | Coefficient $A_4$ | Coefficient $A_5$ |
|---|---|---|---|---|---|
| S1 | 10.07125 | 1.42203E−05 | −1.1215E−08 | 8.27069E−12 | −3.05092E−15 |
| S2 | −3.37495 | 1.25851E−05 | 9.03585E−09 | −3.32153E−11 | 1.65379E−14 |

Figure 5A:
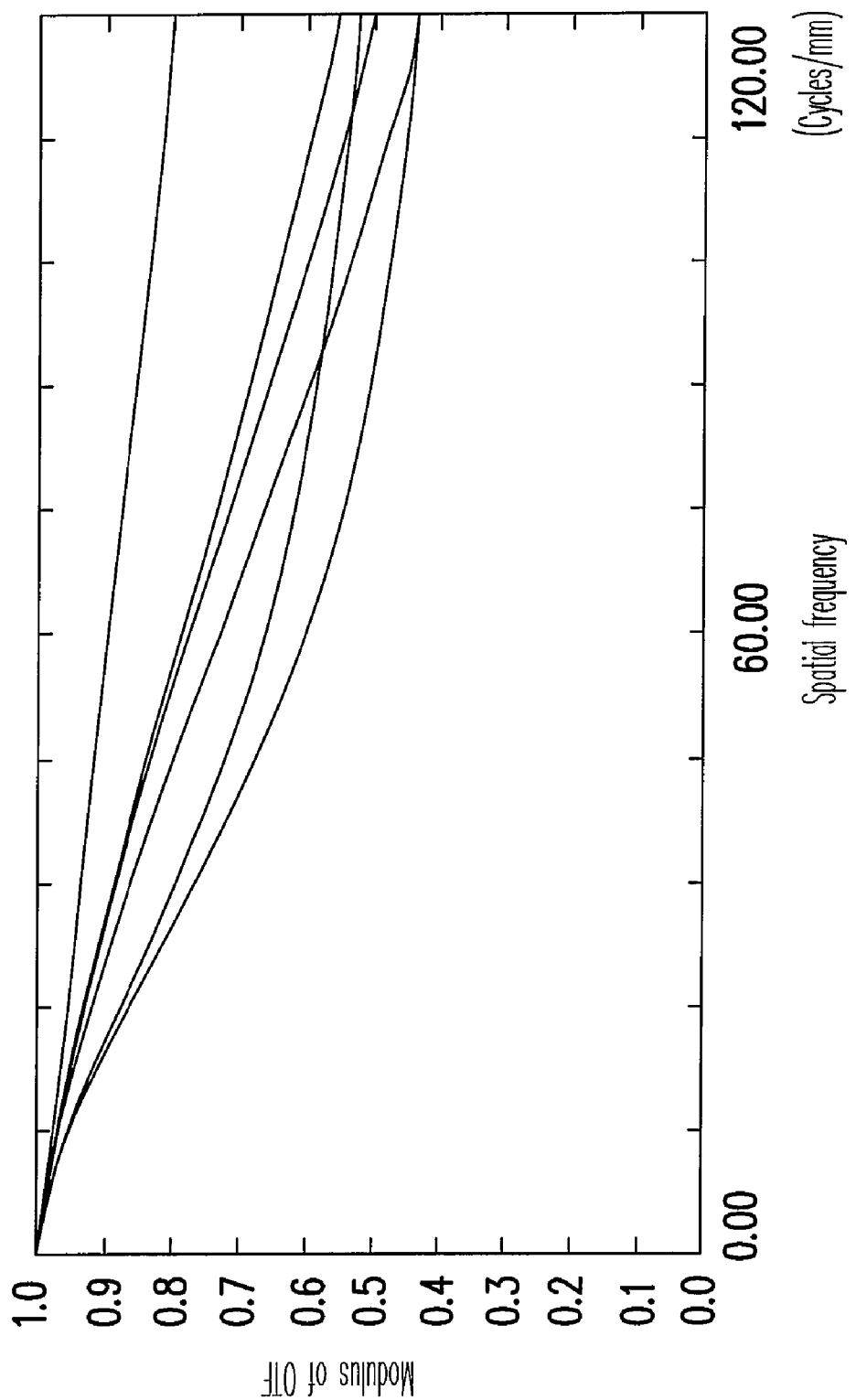
FIGS. 5A-5C are optical data diagrams of imaging of the fixed-focus lens according to the second embodiment of the present invention.
Figure 5B:
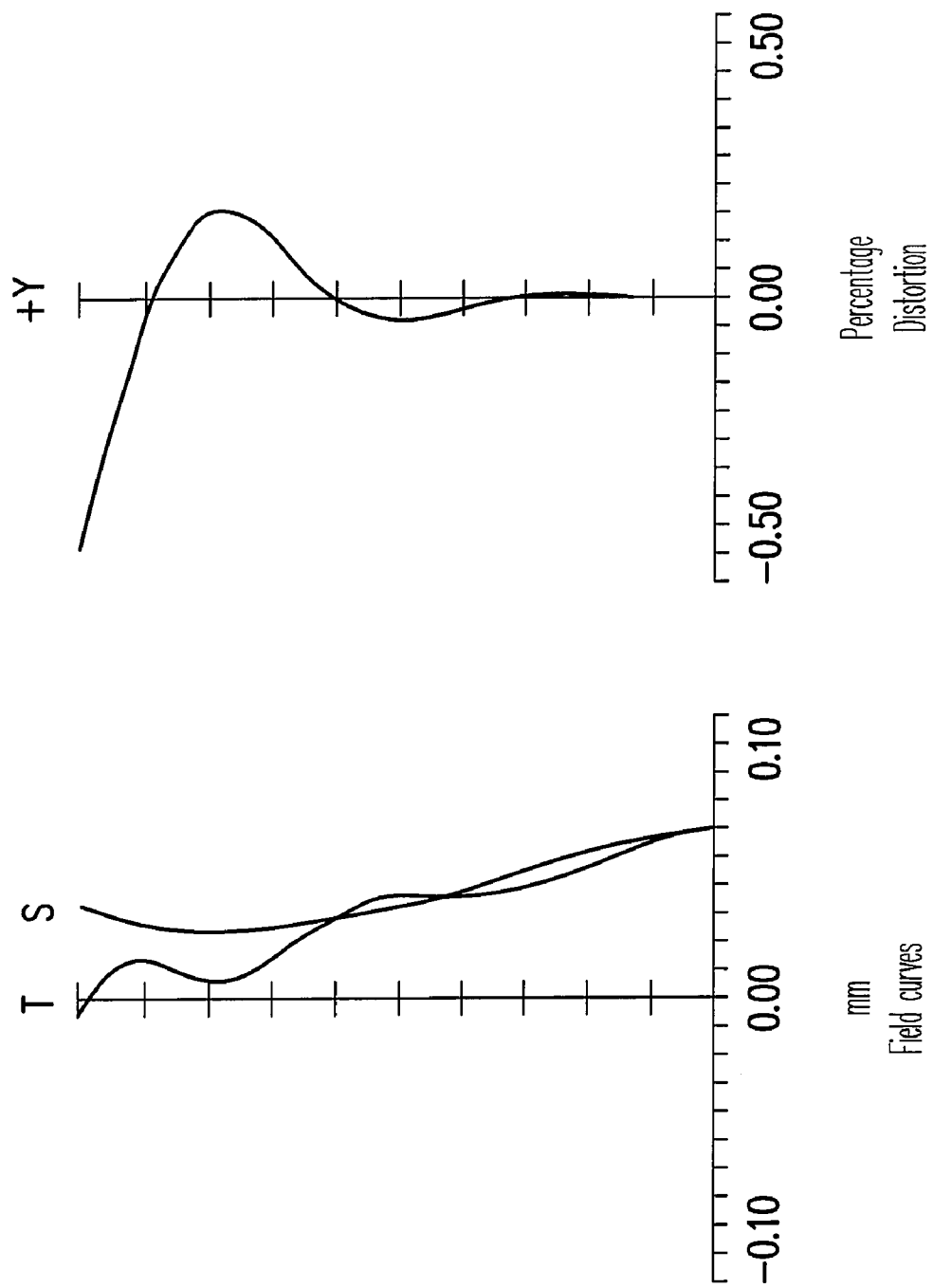
Figure 5C:
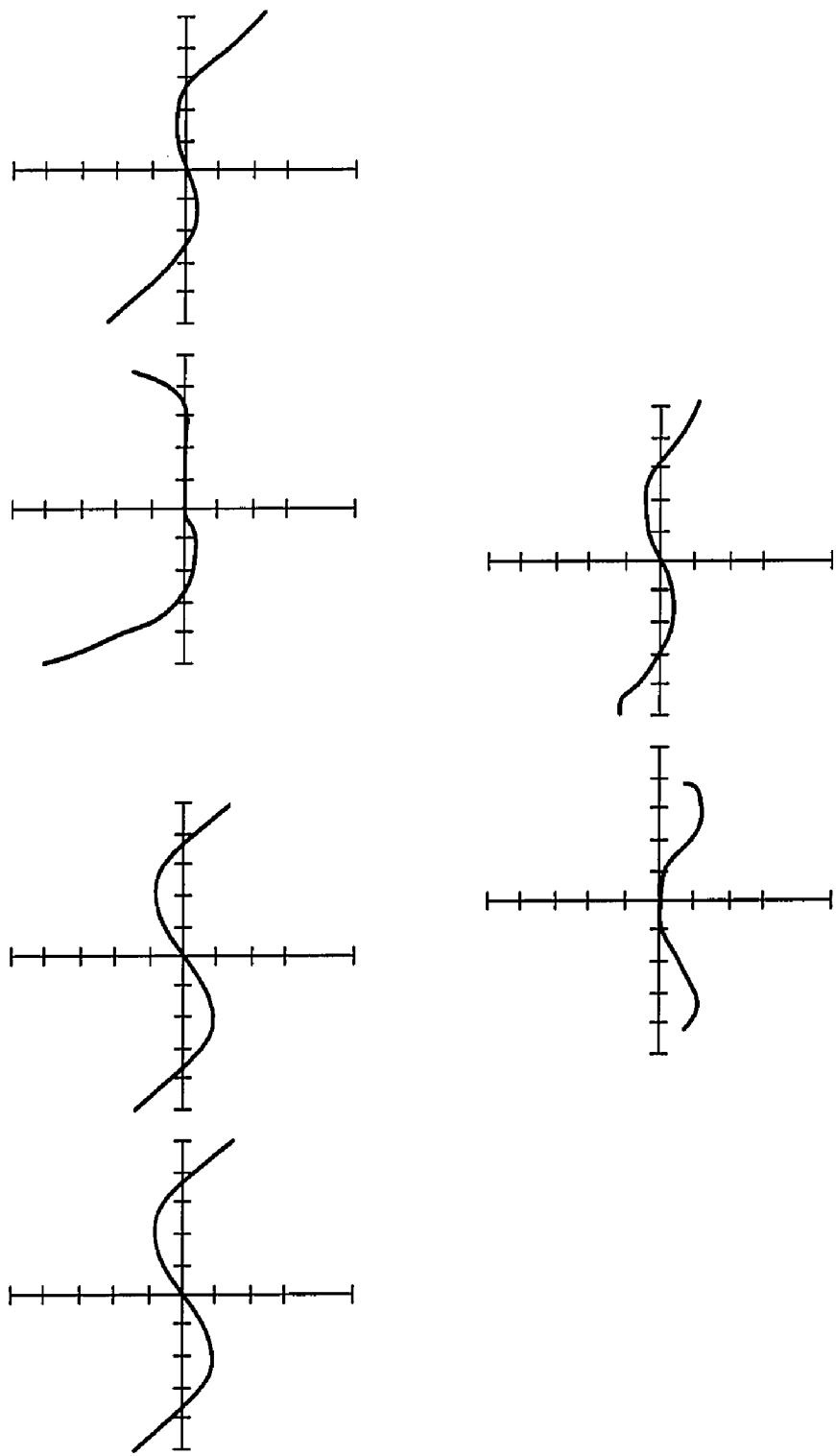

Referring to FIGS. 5A-5C, FIG. 5A is showing the MTF. In FIG. 5A, when the spatial frequency is 50, the modulus of the OTF is still over 0.5, thus satisfying the specification of the standard. In addition, FIG. 5B is the field curve diagram and distortion diagram of images, and FIG. 5C is the transverse ray fan plot of images. Since diagrams of FIGS. 5B and 5C are within the scope of the standard, the fixed-focus lens 300 of the present embodiment has preferable optical quality.

The Third Embodiment

Figure 6:
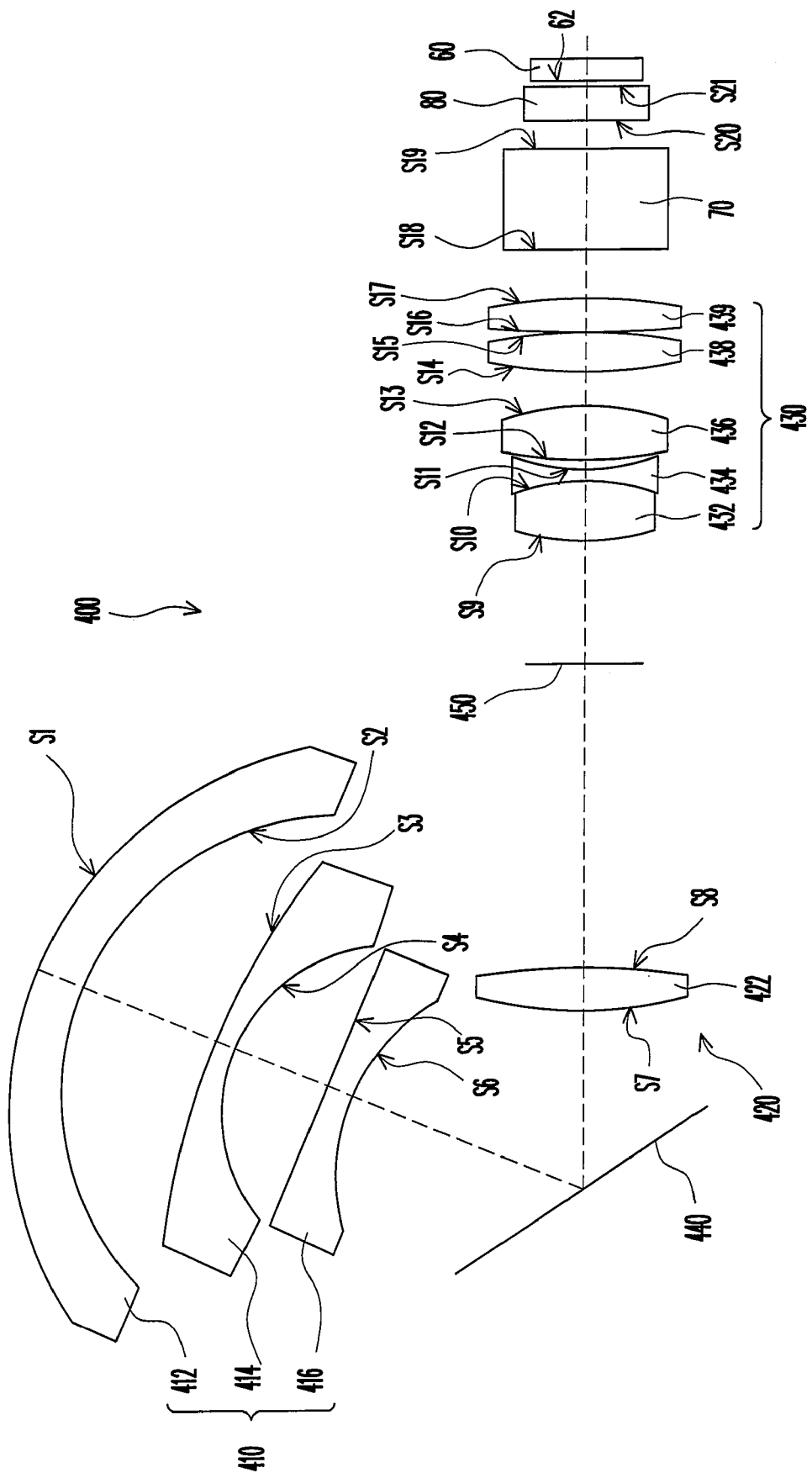
FIG. 6 is a schematic structure view of a fixed-focus lens according to the third embodiment of the present invention.

Referring to FIG. 6, the fixed-focus lens 400 of the present embodiment is suitable for projecting an image beam from a light valve 60 onto a screen (not shown). The fixed-focus lens 400 comprises a first lens group 410, a second lens group 420, and a third lens group 430 arranged in sequence, wherein the third lens group 430 is near the light valve 60. The first lens group 410 has a negative refractive power and comprises at least an aspheric lens, the second lens group 420 has a positive refractive power and comprises at least a lens, and the third lens group 430 has a positive refractive power and comprises at least four lenses. This combination effectively eliminates the aberration and color difference.

In detail, the aforementioned first lens group 410 comprises a first lens 412, a second lens 414, and a third lens 416 arranged in sequence, wherein the third lens 416 is near the second lens group 420, and the first lens 412 is an aspheric lens. The first lens 412, the second lens 414, and the third lens 416 all have negative refractive powers. In addition, the second lens group 420 has a fourth lens 422 with a positive refractive power. The third lens group 430 comprises a fifth lens 432, a sixth lens 434, a seventh lens 436, an eighth lens 438, and a ninth lens 439 arranged in sequence, wherein the fifth lens 432 is near the second lens group 420. The refractive powers of the fifth lens 432, the sixth lens 434, the seventh lens 436, the eighth lens 438, and the ninth lens 439 are respectively positive, negative, positive, positive, and positive.

In the present embodiment, a reflective element 440 (e.g., a reflecting mirror) is disposed between the first lens group 410 and the second lens group 420, such that the fixed-focus lens 400 becomes an L-shaped lens. Thus, the length of the fixed-focus lens 400 is effectively reduced, and an RPTV using the fixed-focus lens 400 becomes thinner. Moreover, an aperture 450 is disposed, for example, between the second lens group 420 and the third lens group 430.

As the first lens 412 is an aspheric lens, the serious aberration caused by the wide-angle incident light is effectively corrected, and especially the improvement to distortions is obvious. In addition, the fixed-focus lens 400 of the present embodiment only comprises nine lenses. Compared with the projection lens 100 using eleven lenses according to the conventional art (as shown in FIG. 1), the manufacturing cost of the fixed-focus lens 400 is lower. Furthermore, in the present embodiment, cheap plastic lenses are used to further reduce the manufacturing cost of the fixed-focus lens 400.

In order to further assure the imaging quality of the fixed-focus lens 400, the limitation that $S_{1-2}/F_3>1.51$, and $F_{11}/F<-18.5$ is required in the present embodiment, wherein $S_{1-2}$ is the shortest distance between the first lens group 410 and the second lens group 420, i.e., the distance of the optical axis of the image beam being transmitted from the fourth lens 422 to the third lens 416. Wherein $F_3$ is the effective focal length of the third lens group 430, $F_{11}$ is the effective focal length of the lens (i.e., the first lens 412) closest to the screen in the first lens group 410, and F is the effective focal length of the fixed-focus lens 400. Moreover, in order to prevent the ghost images, D/h>0.176 is a limitation in the present embodiment. Here, the meanings of D and h are the same as those of the first embodiment, and thus the details will not be described herein again.

A preferred embodiment of the fixed-focus lens 400 with the effective focal length of 4.78 mm is illustrated as follows. However, the numerical values of this effective focal length and data listed Tables 5 and 6 below are not intended to limit the present invention. Those skilled in the art can make appropriate modifications to the parameters or settings with reference to the present invention, and the modifications still fall within the scope of the present invention.

TABLE 5

| Surface | Radius of Curvature (mm) | Distance (mm) | Refractive Index | Abbe Number | Notes |
|---|---|---|---|---|---|
| S1 | 30.7719 | 4.0000 | 1.52 | 52.1 | the first lens |
| S2 | 18.5371 | 19.1527 | | | |
| S3 | 134.1675 | 3.5000 | 1.59 | 61.3 | the second lens |
| S4 | 18.6371 | 11.0436 | | | |
| S5 | 920.8331 | 2.4000 | 1.49 | 70.4 | the third lens |
| S6 | 21.1916 | 54.4844 | | | |
| S7 | 60.8982 | 5.1000 | 1.81 | 40.7 | the fourth lens |
| S8 | −150.7991 | 39.7390 | | | |
| S9 | 24.2223 | 6.5000 | 1.5 | 81.6 | the fifth lens |
| S10 | −15.0487 | 2.0000 | 1.81 | 33.3 | the sixth lens |
| S11 | 26.8000 | 0.8112 | | | |
| S12 | 37.5919 | 4.0000 | 1.49 | 70.4 | the seventh lens |
| S13 | −23.3023 | 2.2391 | | | |
| S14 | 29.9807 | 4.0000 | 1.49 | 70.4 | the eighth lens |
| S15 | −46.0619 | 0.1625 | | | |
| S16 | −140.5719 | 3.00 | 1.85 | 23.8 | the ninth lens |
| S17 | −47.5584 | 3.0465 | | | |
| S18 | Infinity | 10.0000 | 1.52 | 64.2 | prism |
| S19 | Infinity | 4.5000 | | | |
| S20 | Infinity | 3.0000 | 1.49 | 70.4 | protective cover |
| S21 | Infinity | 0.4800 | | | |

In Table 5, surfaces S1, S2 are two surfaces of the first lens 412, surfaces S3, S4 are two surfaces of the second lens 414, surfaces S5, S6 are two surfaces of the third lens 416, and surfaces S7, S8 are two surfaces of the fourth lens 422. Surface S9 is the surface of the fifth lens 432 away from the sixth lens 434, surface S10 is the surface connecting the sixth lens 434 and the fifth lens 432, and surface S11 is the surface of the sixth lens 434 away from the fifth lens 432. Surfaces S12, S13 are two surfaces of the seventh lens 436, surfaces S14, S15 are two surfaces of the eighth lens 438, and surfaces S16, S17 are two surfaces of the ninth lens 439. Surfaces S18, S19 are two surfaces of the prism 70, and surfaces S20, S21 are two surfaces of the protective cover 80 for protecting the light valve 60. The parameters of the radii of curvature and distances of various surfaces are listed in Table 5, and the details will not be repeated herein again.

The above surfaces S1, S2 are aspheric surfaces, and the parameters of the surfaces S1 and S2 are listed in Table 6. Moreover, the equation about aspheric surfaces is as described in the first embodiment.

TABLE 6

| Aspheric Parameter | Conic Coefficient K | Coefficient $A_2$ | Coefficient $A_3$ | Coefficient $A_4$ | Coefficient $A_5$ |
|---|---|---|---|---|---|
| S1 | −4.3432 | −3.6052E−06 | 1.27354E−08 | −9.46646E−12 | 3.30199E−15 |
| S2 | −1.43872 | −1.33545E−05 | 2.88678E−08 | −2.30015E−11 | 5.53763E−15 |

Figure 7A:
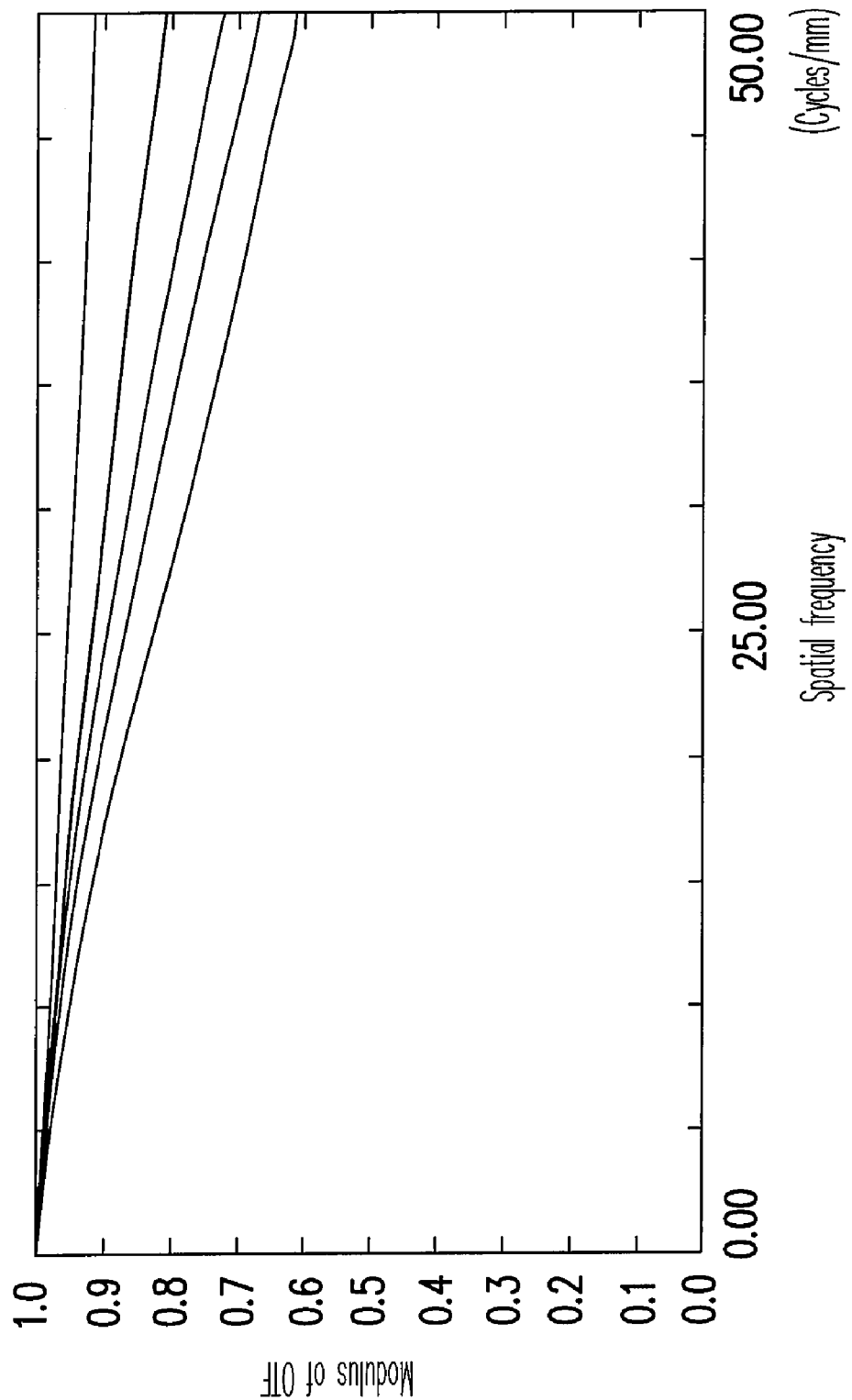
FIGS. 7A-7C are optical data diagrams of imaging of the fixed-focus lens according to the third embodiment of the present invention.
Figure 7B:
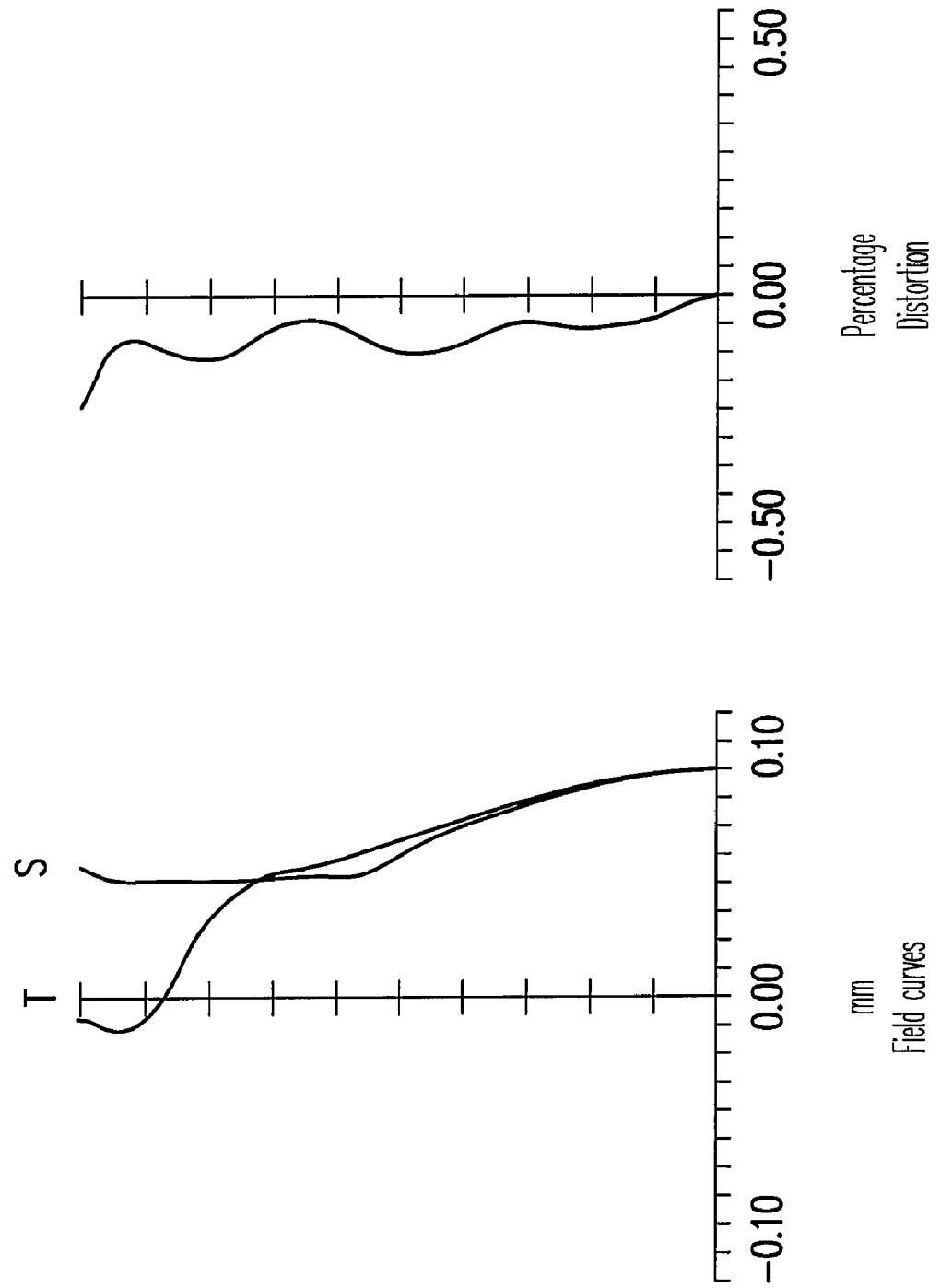
Figure 7C:
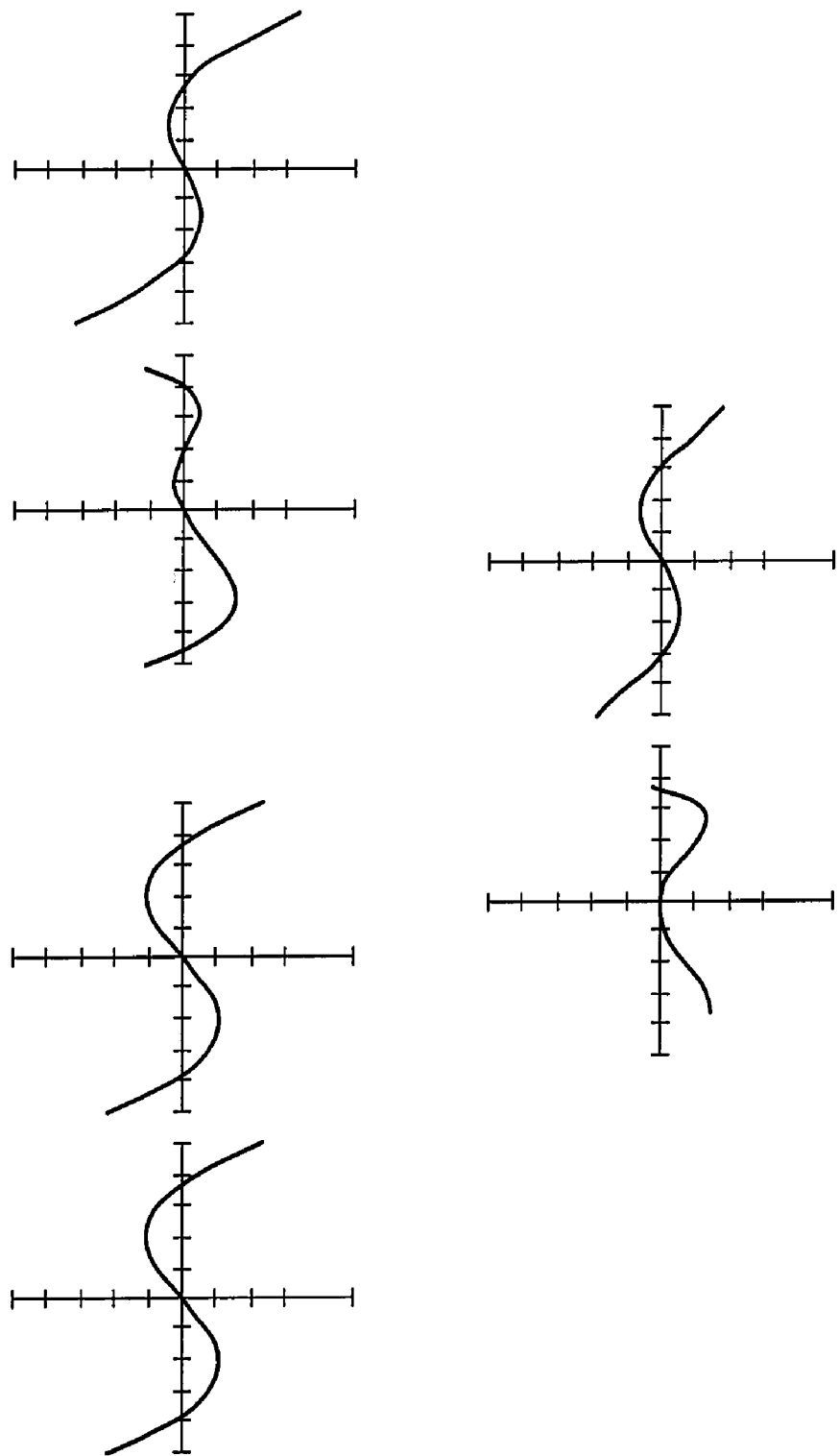

Referring to FIGS. 7A-7C, FIG. 7A is showing the MTF. In FIG. 7A, when the spatial frequency is 50, the modulus of the OTF is still over 0.5, thus satisfying the specification of the standard. In addition, FIG. 7B is the field curve diagram and distortion diagram of images, and FIG. 7C is the transverse ray fan plot of images. Since graphics of FIGS. 7B and 7C are within the scope of the standard, the fixed-focus lens 400 of the present embodiment has preferable optical quality.

The Fourth Embodiment

Figure 8:
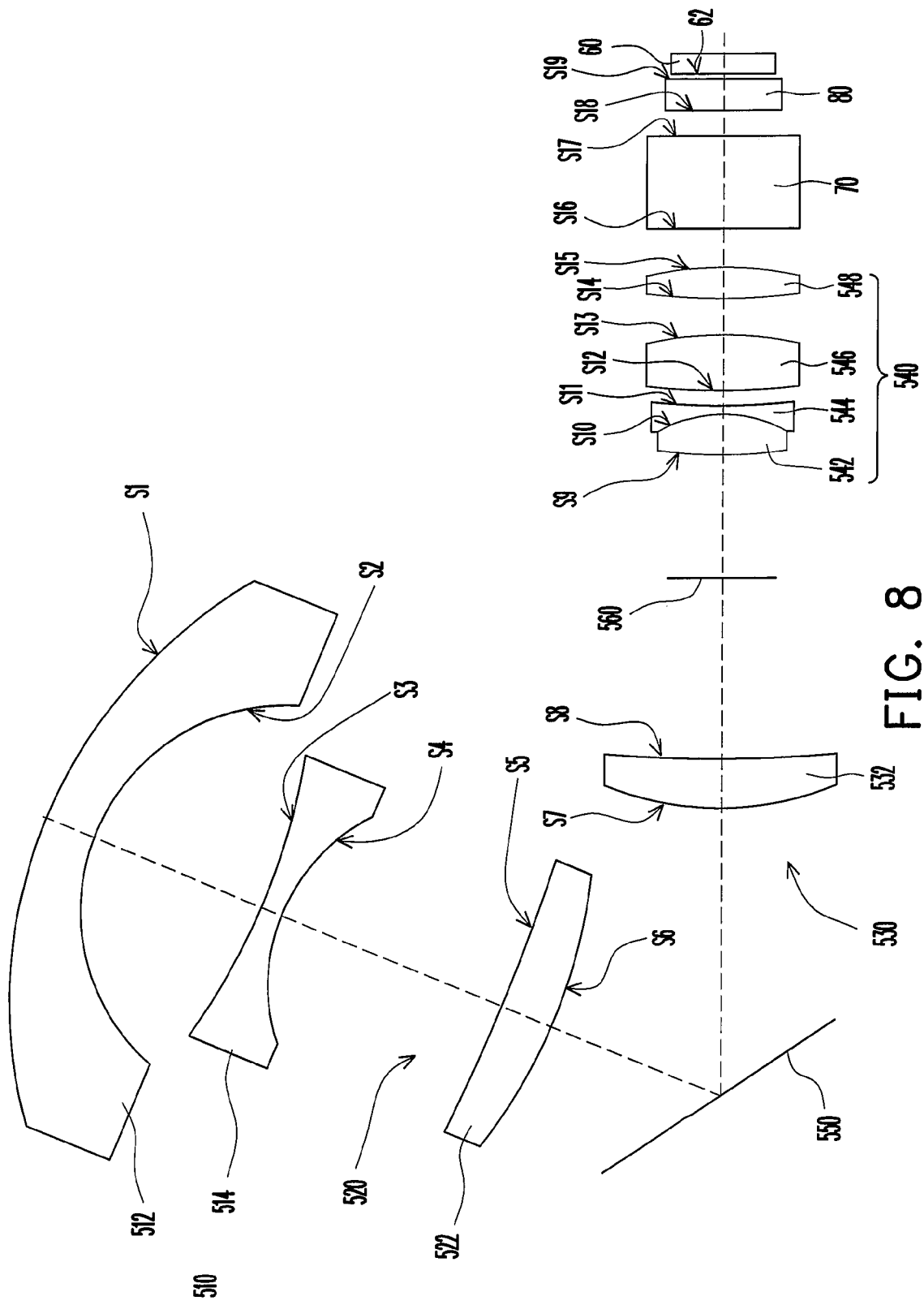
FIG. 8 is a schematic structure view of a fixed-focus lens according to the fourth embodiment of the present invention.

Referring to FIG. 8, the fixed-focus lens 500 of the present embodiment is suitable for projecting an image beam from a light valve 60 onto a screen (not shown). The fixed-focus lens 500 comprises a first lens group 510, a second lens group 520, a third lens group 530, and a fourth lens group 540 arranged in sequence, wherein the fourth lens group 540 is near the light valve 60. The first lens group 510 has a negative refractive power and comprises at least an aspheric lens, the second lens group 520 has a positive refractive power and comprises at least a lens, the third lens group 530 has a positive refractive power and comprises at least a lens, and the fourth lens group 540 has a positive refractive power and comprises at least four lenses. This combination effectively eliminates the aberration and color difference.

In detail, the aforementioned first lens group 510 comprises a first lens 512 and a second lens 514 arranged in sequence, wherein the second lens 514 is near the second lens group 520, and the first lens 512 is an aspheric lens. The first lens 512 and the second lens 514 both have negative refractive powers. In addition, the second lens group 520 comprises a third lens 522 with a positive refractive power, and the third lens group 530 comprises a fourth lens 532 with a positive refractive power. The fourth lens group 540 comprises a fifth lens 542, a sixth lens 544, a seventh lens 546, and an eighth lens 548 arranged in sequence, wherein the fifth lens 542 is near the third lens group 530. The refractive powers of the fifth lens 542, the sixth lens 544, the seventh lens 546, and the eighth lens 548 are positive, negative, positive, and positive respectively.

In the present embodiment, a reflective element 550 (e.g., a reflecting mirror) is disposed between the second lens group 520 and the third lens group 530, such that the fixed-focus lens 500 becomes an L-shaped lens. Thus, the length of the fixed-focus lens 500 is effectively reduced, and an RPTV using the fixed-focus lens 500 becomes thinner. Moreover, an aperture 560 is disposed, for example, between the third lens group 530 and the fourth lens group 540.

As the first lens 512 is an aspheric lens, the serious aberration caused by the wide-angle incident light is effectively corrected, and especially the improvement to distortions is obvious. In addition, the fixed-focus lens 500 of the present embodiment only comprises eight lenses. Compared with the projection lens 100 using eleven lenses according to the conventional art (as shown in FIG. 1), the manufacturing cost of the fixed-focus lens 500 is lower. Furthermore, in the present embodiment, cheap plastic lenses are used to further reduce the manufacturing cost of the fixed-focus lens 500.

In order to further assure the imaging quality of the fixed-focus lens 500, the limitation that $S_{1-2}/F_{34}>0.75$, and $S_{2-3}/F>9.05$ is required in the present embodiment, wherein $S_{1-2}$ is the shortest distance between the first lens group 510 and the second lens group 520, i.e., the distance of the optical axis of the image beam being transmitted from the third lens 522 to the second lens 514. $F_{34}$ is the effective focal length of the third lens group 530 and the fourth lens group 540, $S_{2-3}$ is the distance between the second lens group 520 and the third lens group 530, i.e., the distance of the optical axis of the image beam being transmitted from the fourth lens 532 to the third lens 522, and F is the effective focal length of the fixed-focus lens 500. Moreover, in order to prevent the ghost images, D/h>0.176 is a limitation in the present embodiment. Here, the meanings of D and h are the same as those of the first embodiment, and thus the details will not be described herein again.

A preferred embodiment of the fixed-focus lens 500 with the effective focal length of 5.415 mm is illustrated as follows. However, the numerical values of this effective focal length and data listed Tables 7 and 8 below are not intended to limit the present invention. Those skilled in the art can make appropriate modifications to the parameters or settings with reference to the present invention, and the modifications still fall within the scope of the present invention.

TABLE 7

| Surface | Radius of Curvature (mm) | Distance (mm) | Refractive Index | Abbe Number | Notes |
|---|---|---|---|---|---|
| S1 | 105.9039 | 5.9370 | 1.49 | 57.4 | the first lens |
| S2 | 21.5083 | 22.0921 | | | |
| S3 | −80.9394 | 2.6187 | 1.74 | 49.2 | the second lens |
| S4 | 21.0825 | 34.5463 | | | |
| S5 | −87.7244 | 6.1521 | 1.7 | 30.1 | the third lens |
| S6 | −47.5152 | 49.0131 | | | |
| S7 | 34.1179 | 5.2598 | 1.66 | 50.9 | the fourth lens |
| S8 | 254.6714 | 32.0888 | | | |
| S9 | 31.7858 | 4.6021 | 1.49 | 70.4 | the fifth lens |
| S10 | −13.6281 | 0.9870 | 1.81 | 25.5 | the sixth lens |
| S11 | 82.0294 | 1.4804 | | | |
| S12 | 51.7020 | 6.9337 | 1.49 | 70.4 | the seventh lens |
| S13 | −27.0639 | 3.8462 | | | |
| S14 | 96.4744 | 2.9936 | 1.85 | 23.8 | the eighth lens |
| S15 | −56.5568 | 4.4981 | | | |
| S16 | Infinity | 10.0000 | 1.52 | 64.2 | prism |
| S17 | Infinity | 4.5000 | | | |
| S18 | Infinity | 3.0000 | 1.49 | 70.4 | protective cover |
| S19 | Infinity | 0.4800 | | | |

In Table 7, surfaces S1, S2 are two surfaces of the first lens 512, surfaces S3, S4 are two surfaces of the second lens 514, surfaces S5, S6 are two surfaces of the third lens 522, and surfaces S7, S8 are two surfaces of the fourth lens 532. Surface S9 is the surface of the fifth lens 542 away from the sixth lens 544, surface S10 is the surface connecting the sixth lens 544 and the fifth lens 542, and surface S11 is the surface of the sixth lens 544 away from the fifth lens 542. Surfaces S12, S13 are two surfaces of the seventh lens 546, and surfaces S14, S15 are two surfaces of the eighth lens 548. Surfaces S16, S17 are two surfaces of the prism 70, and surfaces S18, S19 are two surfaces of the protective cover 80 for protecting the light valve 60. The parameters of the radii of curvature and distances of various surfaces are listed in Table 7, and the details will not be repeated herein again.

The above surfaces S1, S2 are aspheric surfaces, and the parameters of the surfaces S1 and S2 are listed in Table 8. Moreover, the equation about aspheric surfaces is as described in the first embodiment.

Figure 9A:
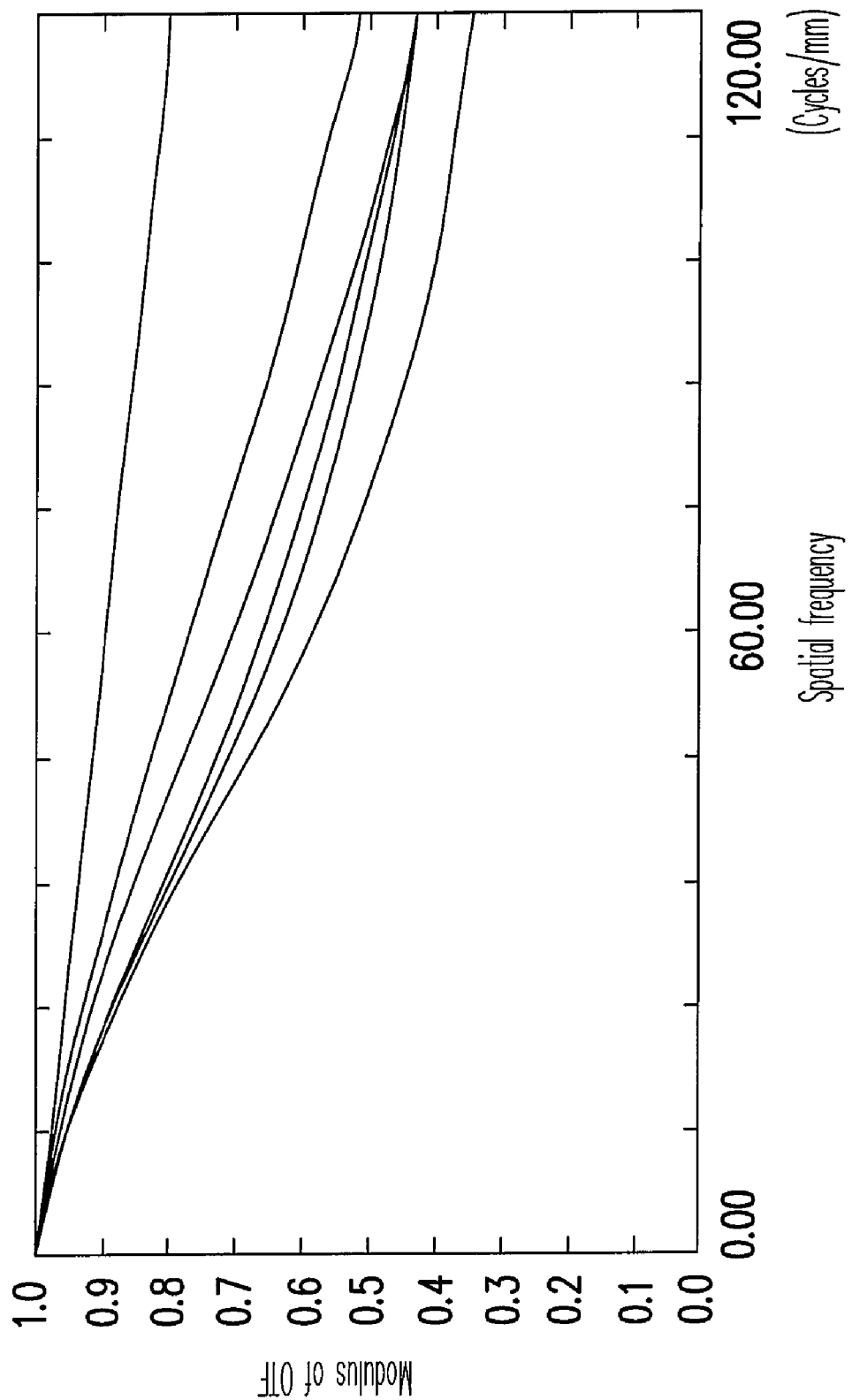
FIGS. 9A-9C are optical data diagrams of imaging of the fixed-focus lens according to the fourth embodiment of the present invention.
Figure 9B:
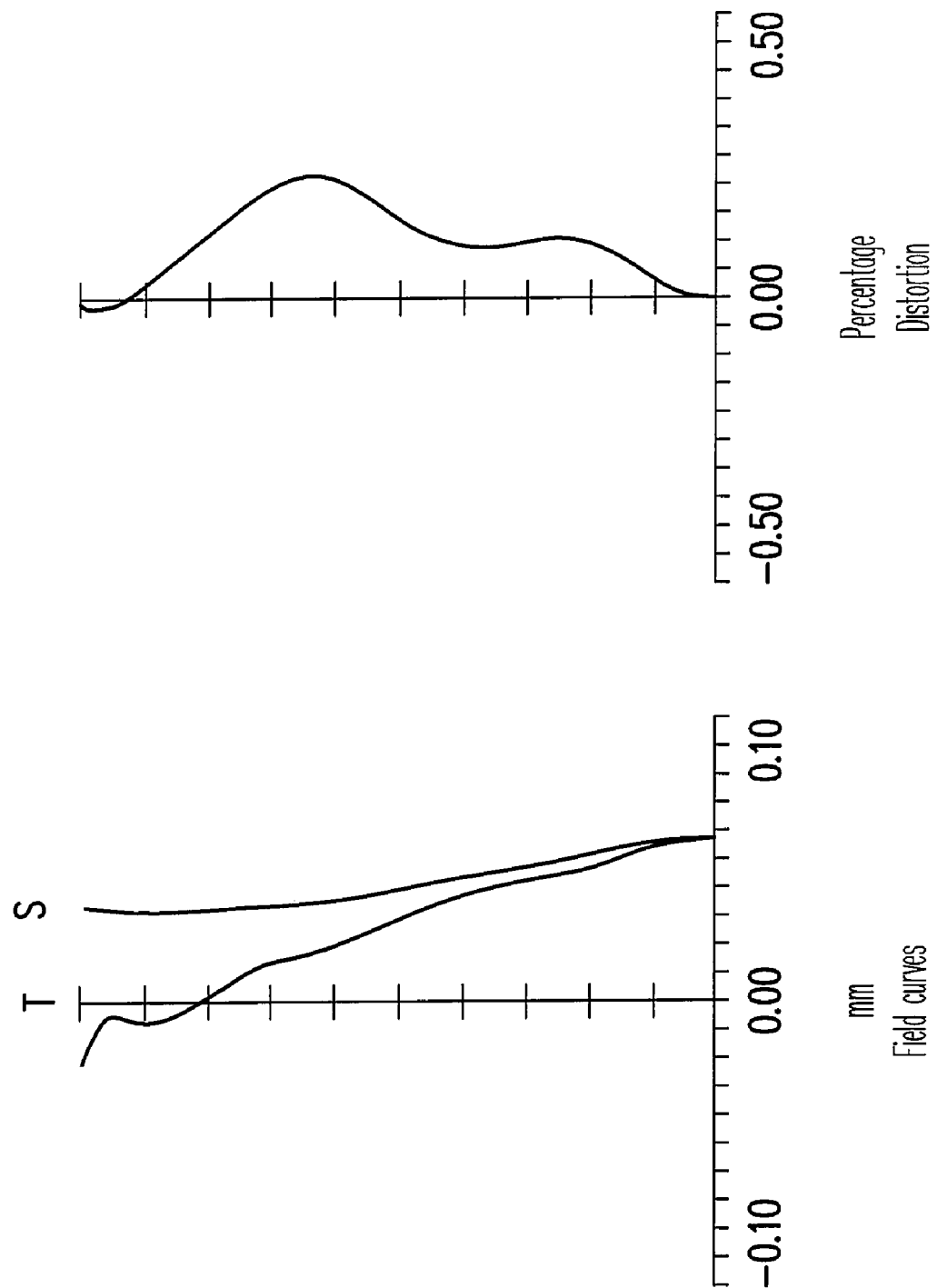
Figure 9C:
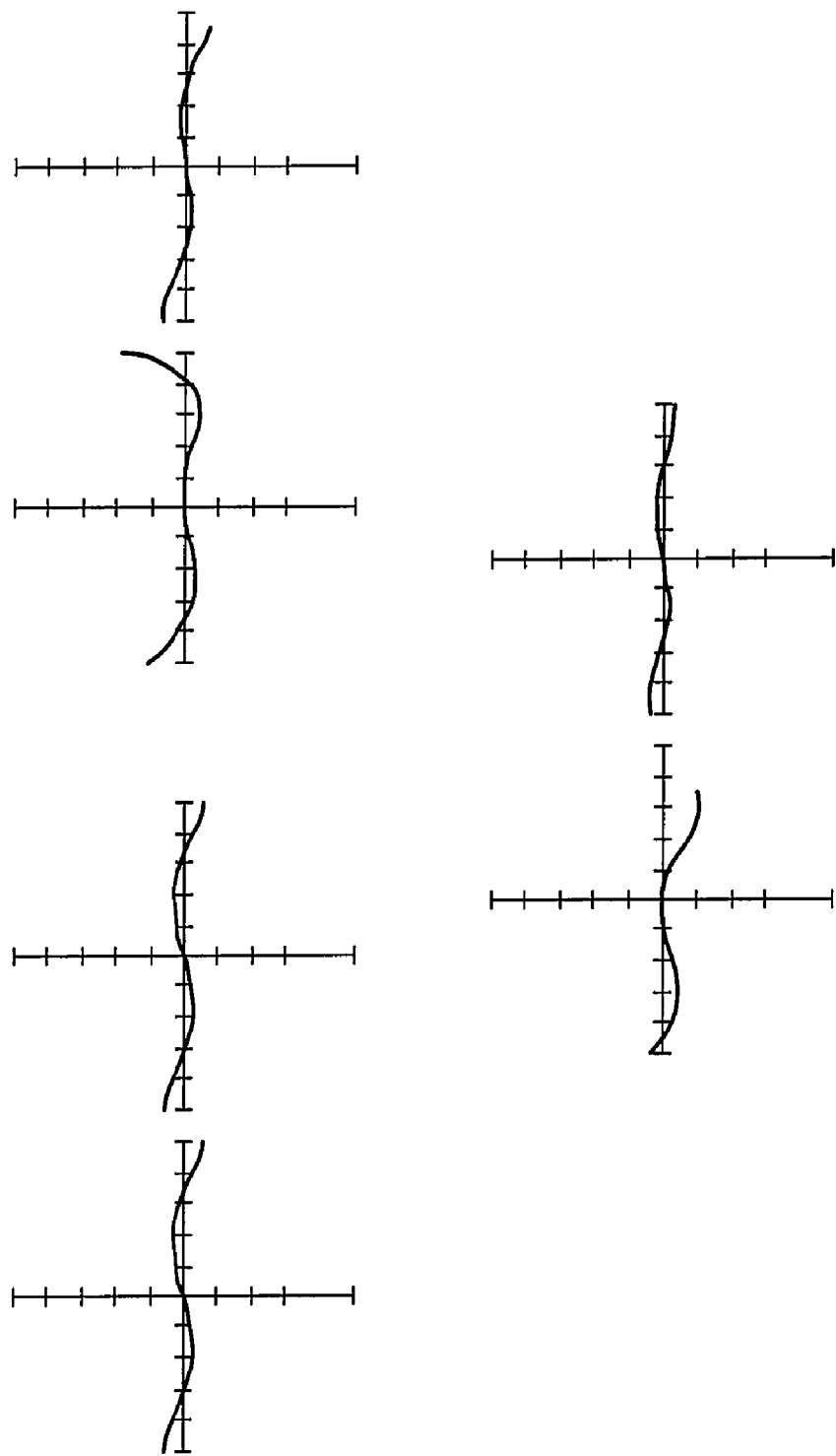

Referring to FIGS. 9A-9C, FIG. 9A is showing the MTF. In FIG. 9A, when the spatial frequency is 50, the modulus of the OTF is still over 0.5, thus satisfying the specification of the standard. In addition, FIG. 9B is the field curve diagram and distortion diagram of images, and FIG. 9C is the transverse ray fan plot of images. Since graphics of FIGS. 9B and 9C are within the scope of the standard, the fixed-focus lens 500 of the present embodiment has preferable optical quality.

The Fifth Embodiment

Figure 10:
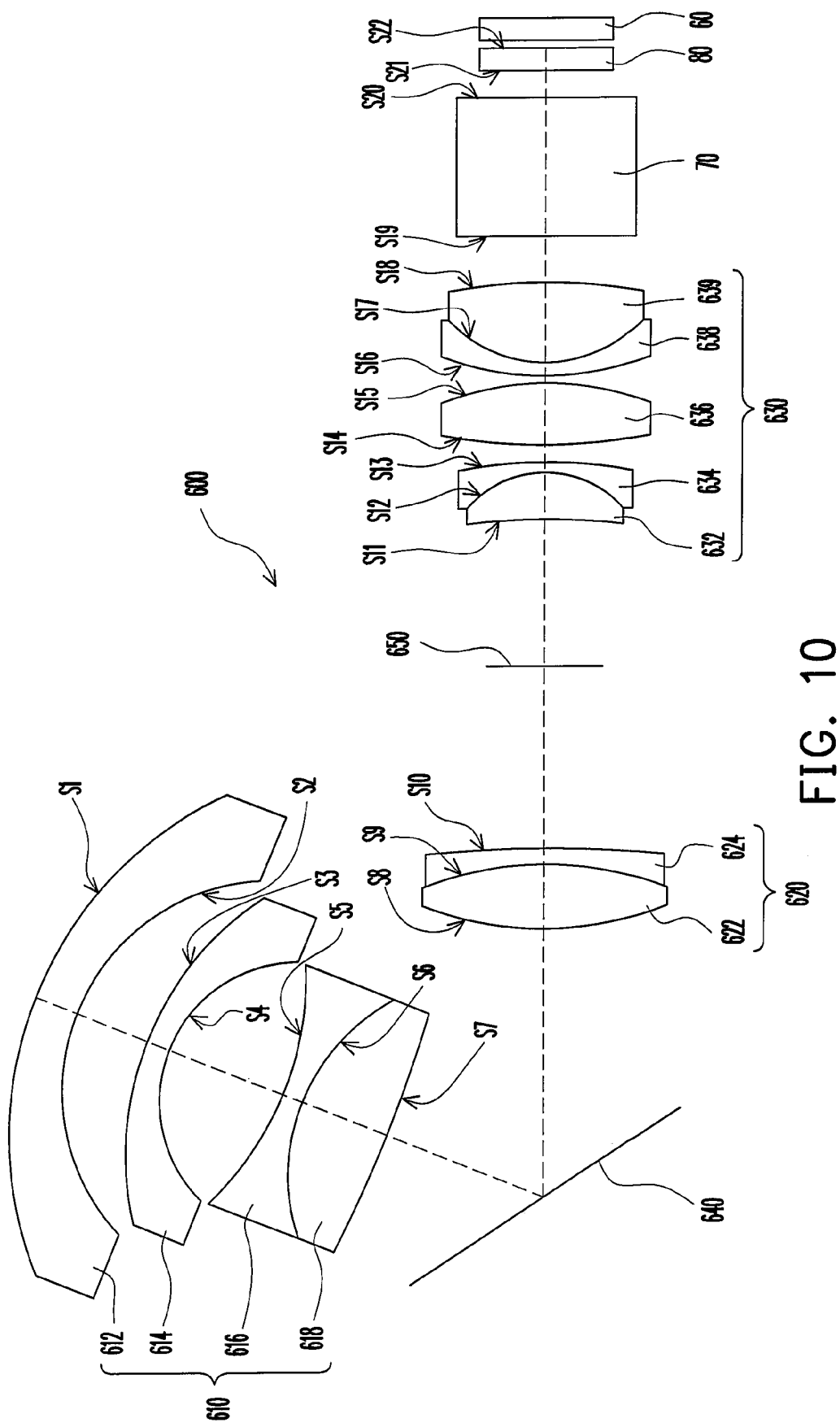
FIG. 10 is a schematic structure view of a fixed-focus lens according to the fifth embodiment of the present invention.

Referring to FIG. 10, the fixed-focus lens 600 of the present embodiment is suitable for projecting an image beam from a light valve 60 onto a screen (not shown). The fixed-focus lens 600 comprises a first lens group 610, a second lens group 620, and a third lens group 630 arranged in sequence, wherein the third lens group 630 is near the light valve 60. The first lens group 610 has a negative refractive power and comprises an aspheric lens and a lens with a positive refractive power, the second lens group 620 has a positive refractive power and comprises at least a lens, and the third lens group 630 has a positive refractive power and comprises at least five lenses. This combination effectively eliminates the aberration and color difference.

In detail, the aforementioned first lens group 610 comprises a first lens 612, a second lens 614, and a third lens 616, and a fourth lens 618 arranged in sequence, wherein the fourth lens 618 is near the second lens group 620, and the first lens 612 is an aspheric lens. The refractive powers of the first lens 612, the second lens 614, the third lens 616, and the fourth lenses 618 are negative, negative, negative, and positive respectively. In addition, the second lens group 620 comprises a fifth lens 622 and a sixth lens 624 arranged in sequence, wherein the fifth lens 622 is near the first lens group 610. The refractive powers of the fifth lens 622 and the sixth lens 624 are positive and negative respectively. The third lens group 630 comprises a seventh lens 632, an eighth lens 634, a ninth lens 636, a tenth lens 638, and an eleventh lens 639 arranged in sequence, wherein the seventh lens 632 is near the second lens group 620. The refractive powers of the seventh lens 632, the eighth lens 634, the ninth lens 636, the tenth lens 638, and the eleventh lens 639 are positive, negative, positive, negative, and positive respectively.

In the present embodiment, a reflective element 640 (e.g., a reflecting mirror) is disposed between the first lens group 610 and the second lens group 620, such that the fixed-focus lens 600 becomes an L-shaped lens. Thus, the length of the fixed-focus lens 600 is effectively reduced, and an RPTV using the fixed-focus lens 600 becomes thinner. Moreover, an aperture 650 is disposed, for example, between the second lens group 620 and the third lens group 630.

As the first lens 612 is an aspheric lens, the serious aberration caused by the wide-angle incident light is effectively corrected, and especially the improvement to distortions is obvious. Furthermore, in the present embodiment, cheap plastic lenses are used to further reduce the manufacturing cost of the fixed-focus lens 600.

TABLE 8

| Aspheric Parameter | Conic Coefficient K | Coefficient $A_2$ | Coefficient $A_3$ | Coefficient $A_4$ | Coefficient $A_5$ |
|---|---|---|---|---|---|
| S1 | 8.8482 | 8.54953E−06 | −8.3976E−09 | 4.93371E−12 | −9.50487E−16 |
| S2 | −3.17949 | 3.86429E−05 | −2.9174E−08 | 1.82533E−11 | −1.17903E−14 |

In order to further assure the imaging quality of the fixed-focus lens 600, the limitation that $S_{1-2}/F_3>1.51$ is required in the present embodiment, wherein $S_{1-2}$ is the shortest distance between the first lens group 610 and the second lens group 620, i.e., the distance of the optical axis of the image beam being transmitted from the fifth lens 622 to the fourth lens 618. F3 is the effective focal length of the third lens group 630. Moreover, in order to prevent the ghost images, D/h>0.176 is a limitation in the present embodiment. Here, the meanings of D and h are the same as those of the first embodiment, and thus the details will not be described herein again.

A preferred embodiment of the fixed-focus lens 600 with the effective focal length of 7.89 mm is illustrated as follows. However, the numerical values of this effective focal length and data listed Tables 9 and 10 below are not intended to limit the present invention. Those skilled in the art can make appropriate modifications to the parameters or settings with reference to the present invention, and the modifications still fall within the scope of the present invention.

634 and the seventh lens 632, and surface S13 is the surface of the eighth lens 634 away from the seventh lens 632. Surfaces S14, S15 are two surfaces of the ninth lens 636. Surface S16 is the surface of the tenth lens 638 away from the eleventh lens 639, surface S17 is the surface connecting the eleventh lens 639 and the tenth lens 638, and surface S18 is the surface of the eleventh lens 639 away from the tenth lens 638. Surfaces S19, S20 are two surfaces of the prism 70, and surfaces S21, S22 are two surfaces of the protective cover 80 for protecting the light valve 60. The parameters of the radii of curvature and distances of various surfaces are listed in Table 9, and the details will not be repeated herein again.

The above surfaces S1, S2 are aspheric surfaces, and the parameters of the surfaces S1 and S2 are listed in Table 10. Moreover, the equation about aspheric surfaces is as described in the first embodiment.

TABLE 10

| Aspheric Parameter | Conic Coefficient K | Coefficient $A_2$ | Coefficient $A_3$ | Coefficient $A_4$ | Coefficient $A_5$ |
|---|---|---|---|---|---|
| S1 | 1.9721 | 9.19345E−06 | −1.0524E−08 | 6.64938E−12 | −1.65662E−15 |
| S2 | −3.12148 | 3.42407E−05 | −3.219E−08 | 6.0885E−12 | 6.60979E−16 |

TABLE 9

| Surface | Radius of Curvature (mm) | Distance (mm) | Refractive Index | Abbe Number | Notes |
|---|---|---|---|---|---|
| S1 | 73.98326099 | 5.81426 | 1.49 | 57.4 | the first lens |
| S2 | 23.9547 | 12.7476 | | | |
| S3 | 46.2560 | 2.4504 | 1.81 | 25.5 | the second lens |
| S4 | 18.7413 | 14.4093 | | | |
| S5 | −37.7267 | 2.4203 | 1.59 | 61.3 | the third lens |
| S6 | 23.7231 | 10.9481 | 1.62 | 36.3 | the fourth lens |
| S7 | −133.1573 | 57.0101 | | | |
| S8 | 52.1309 | 7.1712 | 1.67 | 32.2 | the fifth lens |
| S9 | −40.8464 | 2.7971 | 1.85 | 23.8 | the sixth lens |
| S10 | −130.1547 | 43.8440 | | | |
| S11 | −199.1652 | 8.7867 | 1.49 | 70.4 | the seventh lens |
| S12 | −14.2711 | 1.3262 | 1.81 | 40.7 | the eighth lens |
| S13 | −66.7175 | 3.0105 | | | |
| S14 | 57.0850 | 9.5318 | 1.49 | 70.4 | the ninth lens |
| S15 | −29.9222 | 0.3850 | | | |
| S16 | 35.5914 | 1.6676 | 1.84 | 43 | the tenth lens |
| S17 | 17.2416 | 11.0361 | 1.5 | 81.6 | the eleventh lens |
| S18 | −60.7403 | 7.7594 | | | |
| S19 | Infinity | 18.0000 | 1.52 | 64.2 | prism |
| S20 | Infinity | 4.0000 | | | |
| S21 | Infinity | 3.0000 | 1.49 | 70.4 | protective cover |
| S22 | Infinity | 0.4830 | | | |

Figure 11A:
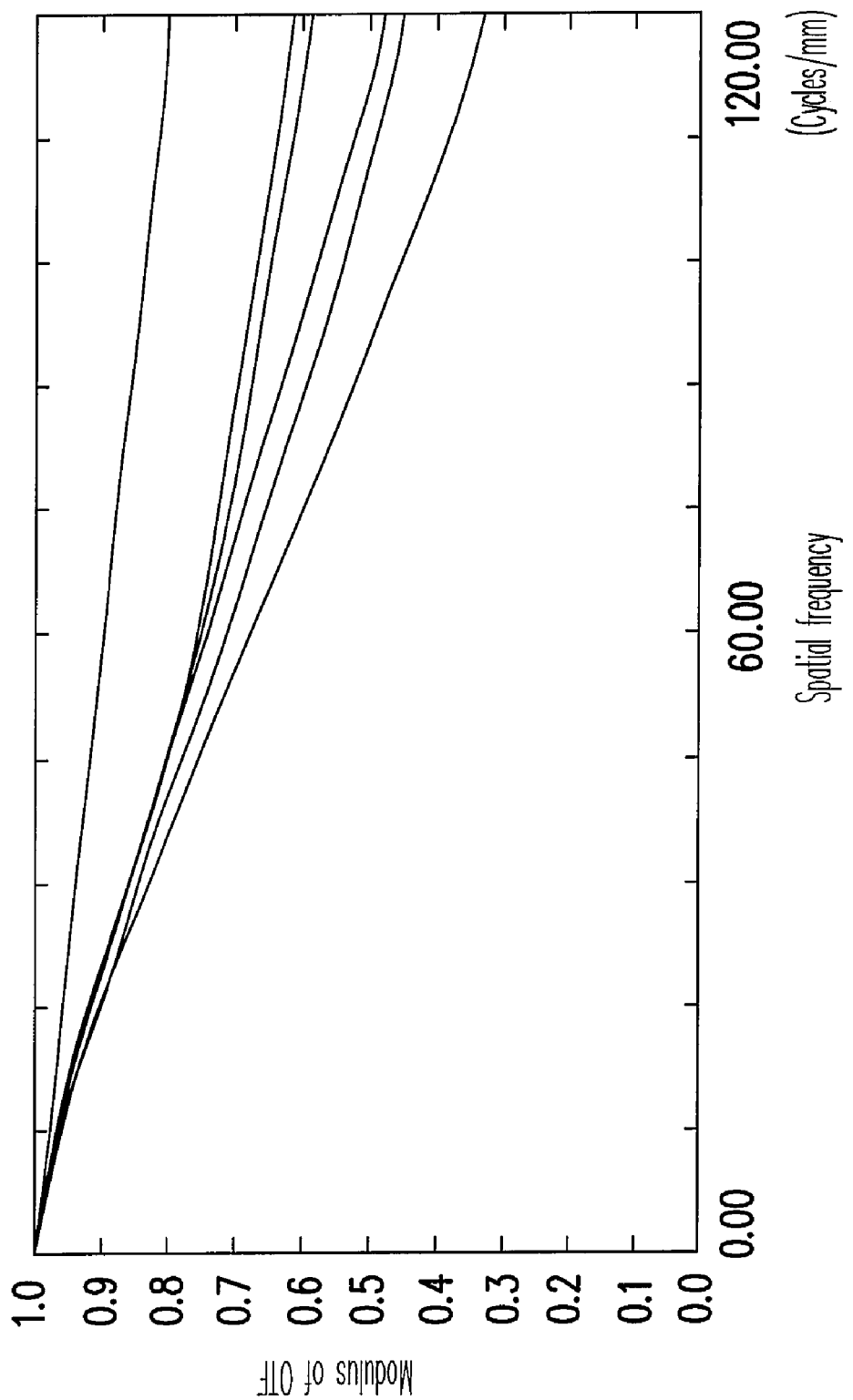
FIGS. 11A-11C are optical data diagrams of imaging of the fixed-focus lens according to the fifth embodiment of the present invention.
Figure 11B:
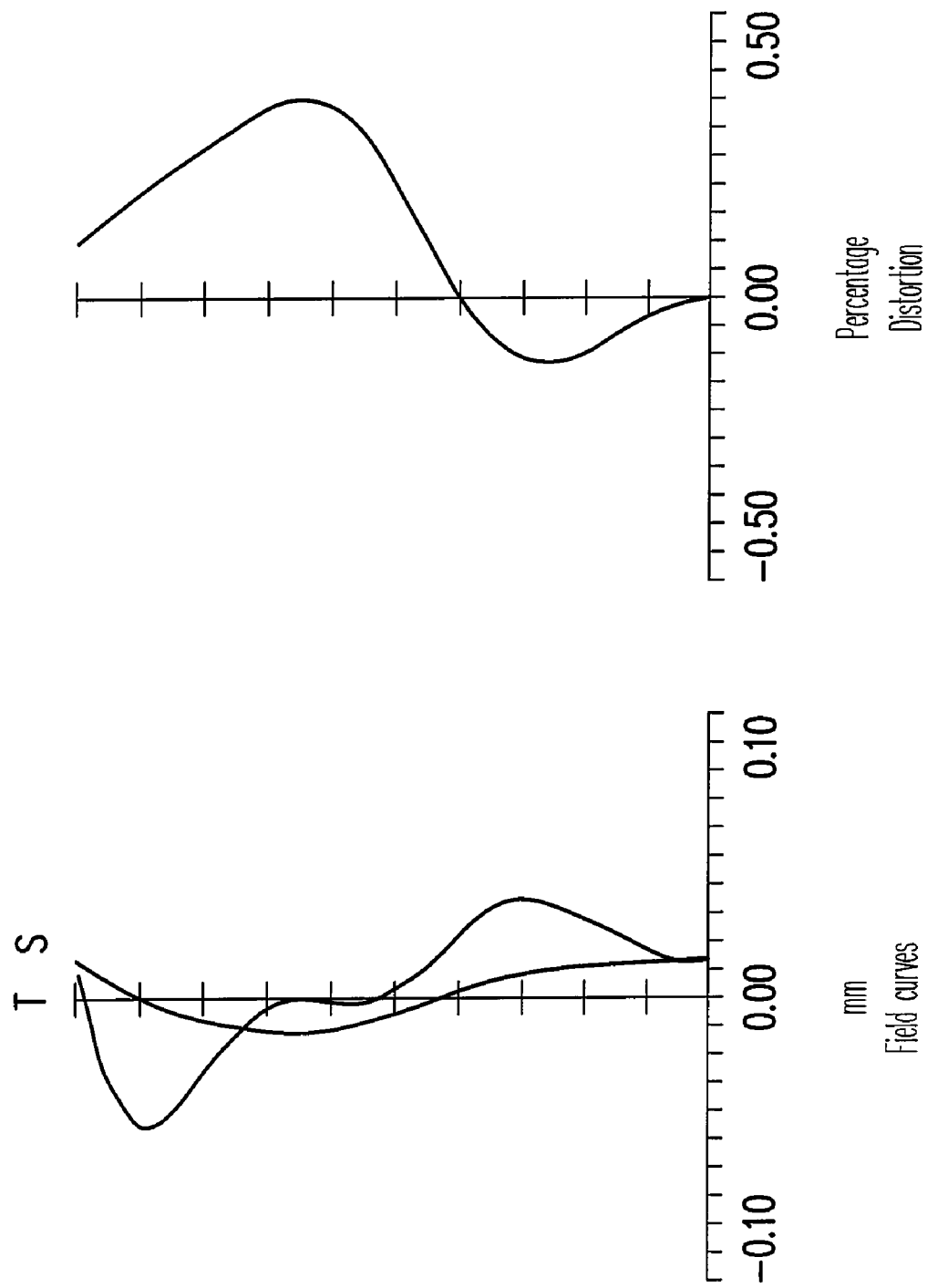
Figure 11C:
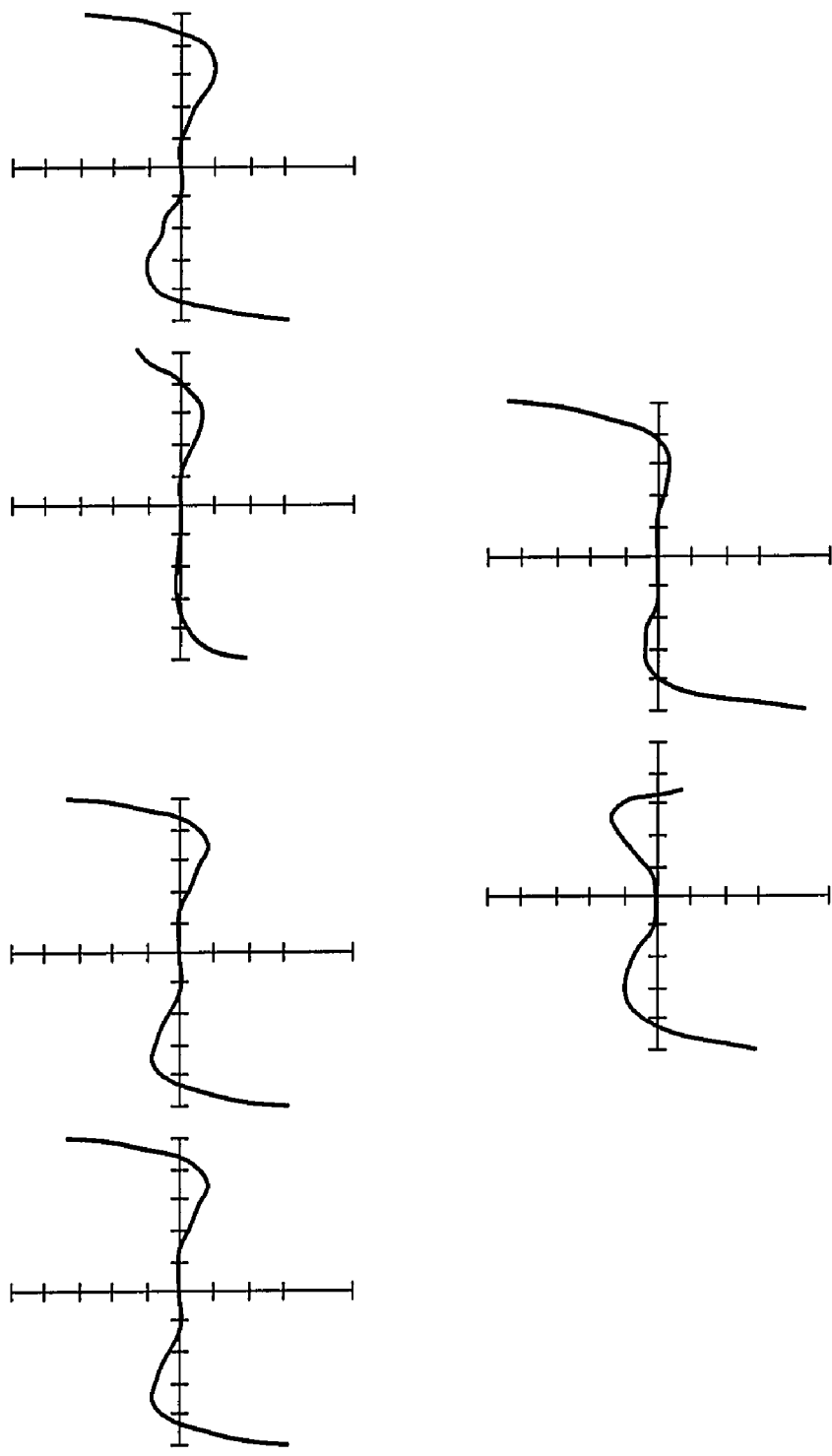

In Table 9, surfaces S1, S2 are two surfaces of the first lens 612, and surfaces S3, S4 are two surfaces of the second lens 614. Surface S5 is the surface of the third lens 616 away from the fourth lens 618, surface S6 is the surface connecting the fourth lens 618 and the third lens 616, and surface S7 is the surface of the fourth lens 618 away from the third lens 616. Surface S8 is the surface of the fifth lens 622 away from the sixth lens 624, surface S9 is the surface connecting the sixth lens 624 and the fifth lens 622, and surface S10 is the surface of the sixth lens 624 away from the fifth lens 622. Surface S11 is the surface of the seventh lens 632 away from the eighth lens 634, surface S12 is the surface connecting the eighth lens Referring to FIGS. 11A-11C, FIG. 11A is showing the MTF. In FIG. 11A, when the spatial frequency is 50, the modulus of the OTF is still over 0.5, thus satisfying the specification of the standard. In addition, FIG. 11B is the field curve diagram and distortion diagram of images, and FIG. 11C is the transverse ray fan plot of images. Since graphics of FIGS. 11B and 11C are within the scope of the standard, the fixed-focus lens 600 of the present embodiment has preferable optical quality.

A preferred embodiment of the fixed-focus lens 600 with the effective focal length of 7.24 nun is illustrated as follows. However, the numerical values of this effective focal length and data listed Tables 11 and 12 below are not intended to limit the present invention. Those skilled in the art can make appropriate modifications to the parameters or settings with reference to the present invention, and the modifications still fall within the scope of the present invention.

TABLE 11

| Surface | Radius of Curvature (mm) | Distance (mm) | Refractive Index | Abbe Number | Notes |
|---|---|---|---|---|---|
| S1 | 86.48659869 | 5.1871647 | 1.49 | 57.4 | the first lens |
| S2 | 24.4670 | 11.5376 | | | |
| S3 | 40.8693 | 2.6561 | 1.81 | 25.5 | the second lens |
| S4 | 18.3644 | 15.9798 | | | |
| S5 | −38.7575 | 3.0261 | 1.59 | 61.3 | the third lens |
| S6 | 24.2943 | 10.9957 | 1.62 | 36.3 | the fourth lens |
| S7 | −205.1236 | 58.5787 | | | |
| S8 | 50.4026 | 7.4922 | 1.67 | 32.2 | the fifth lens |
| S9 | −39.6910 | 2.2313 | 1.85 | 23.8 | the sixth lens |
| S10 | −125.8994 | 43.1842 | | | |
| S11 | −288.8269 | 6.7403 | 1.49 | 70.4 | the seventh lens |
| S12 | −13.4153 | 1.3607 | 1.81 | 40.7 | the eighth lens |
| S13 | −66.1658 | 3.0607 | | | |
| S14 | 52.9875 | 7.5045 | 1.49 | 70.4 | the ninth lens |
| S15 | −28.1482 | 0.1981 | | | |
| S16 | 37.7023 | 1.6335 | 1.79 | 43.9 | the tenth lens |
| S17 | 16.2061 | 9.6110 | 1.5 | 81.6 | the eleventh lens |
| S18 | −52.8655 | 6.2521 | | | |
| S19 | Infinity | 18.0000 | 1.52 | 64.2 | prism |
| S20 | Infinity | 4.0000 | | | |
| S21 | Infinity | 3.0000 | 1.49 | 70.4 | protective cover |
| S22 | Infinity | 0.4830 | | | |

The above surfaces S1, S2 are aspheric surfaces, and the parameters of the surfaces S1 and S2 are listed in Table 12. Moreover, the equation about aspheric surfaces is as described in the first embodiment.

TABLE 12

| Aspheric Parameter | Conic Coefficient K | Coefficient $A_2$ | Coefficient $A_3$ | Coefficient $A_4$ | Coefficient $A_5$ |
|---|---|---|---|---|---|
| S1 | 3.0995 | 1.18688E−05 | −1.4248E−08 | 9.47371E−12 | −2.52553E−15 |
| S2 | −3.79352 | 3.94822E−05 | −3.9E−08 | 7.57086E−12 | 1.19914E−15 |

Figure 12A:
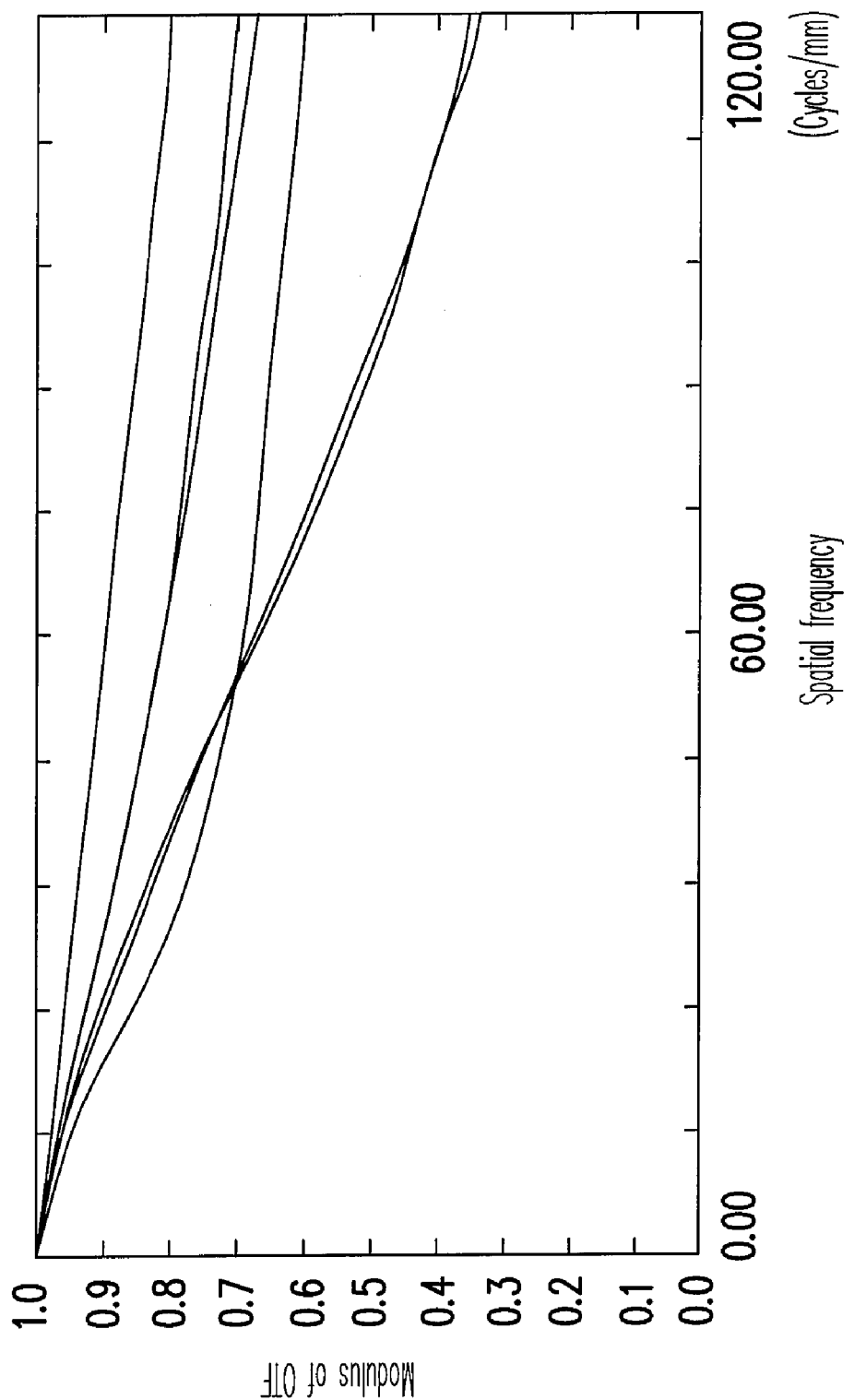
FIGS. 12A-12C are optical data diagrams of imaging of another fixed-focus lens according to the fifth embodiment of the present invention.
Figure 12B:
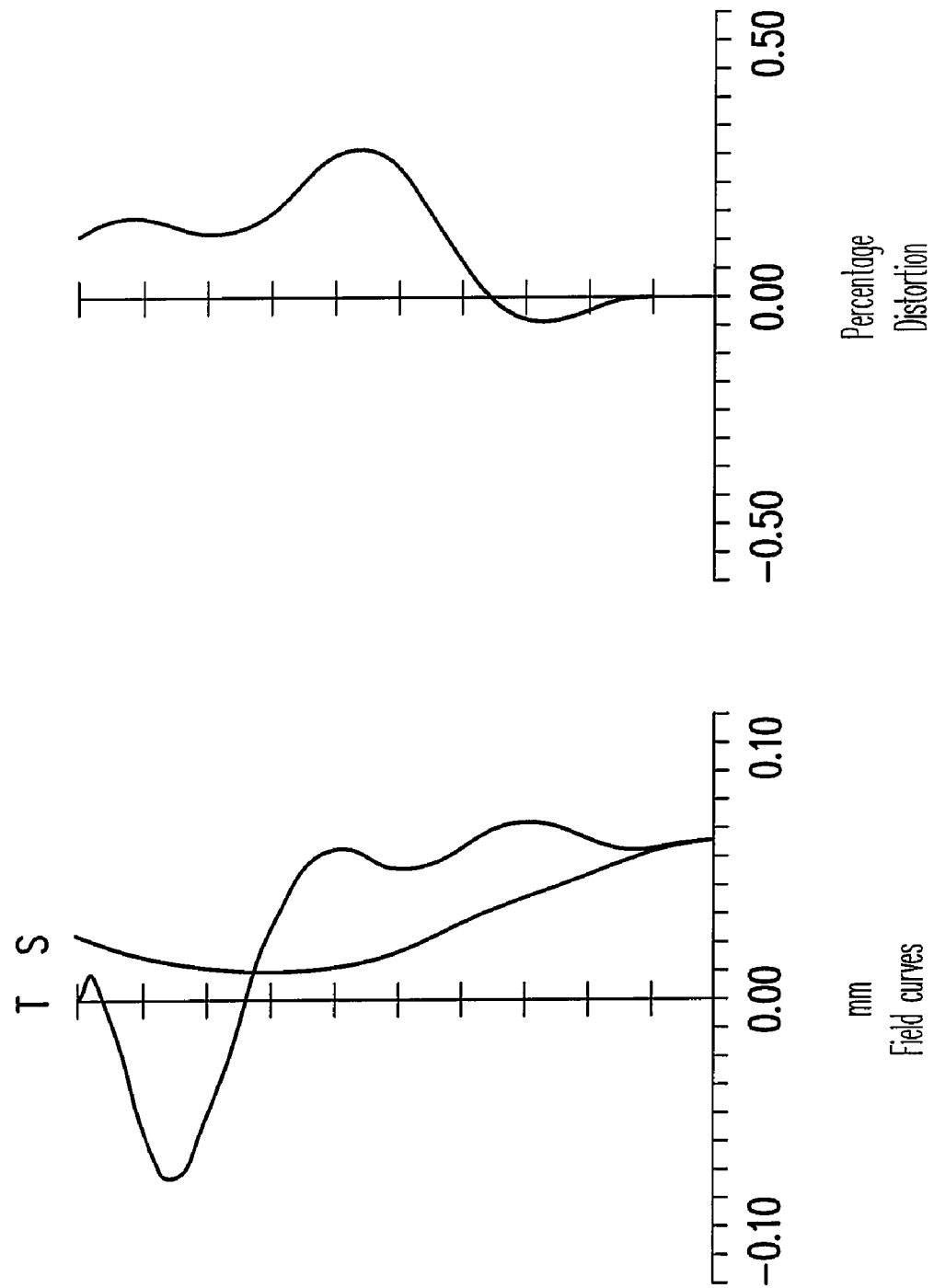
Figure 12C:
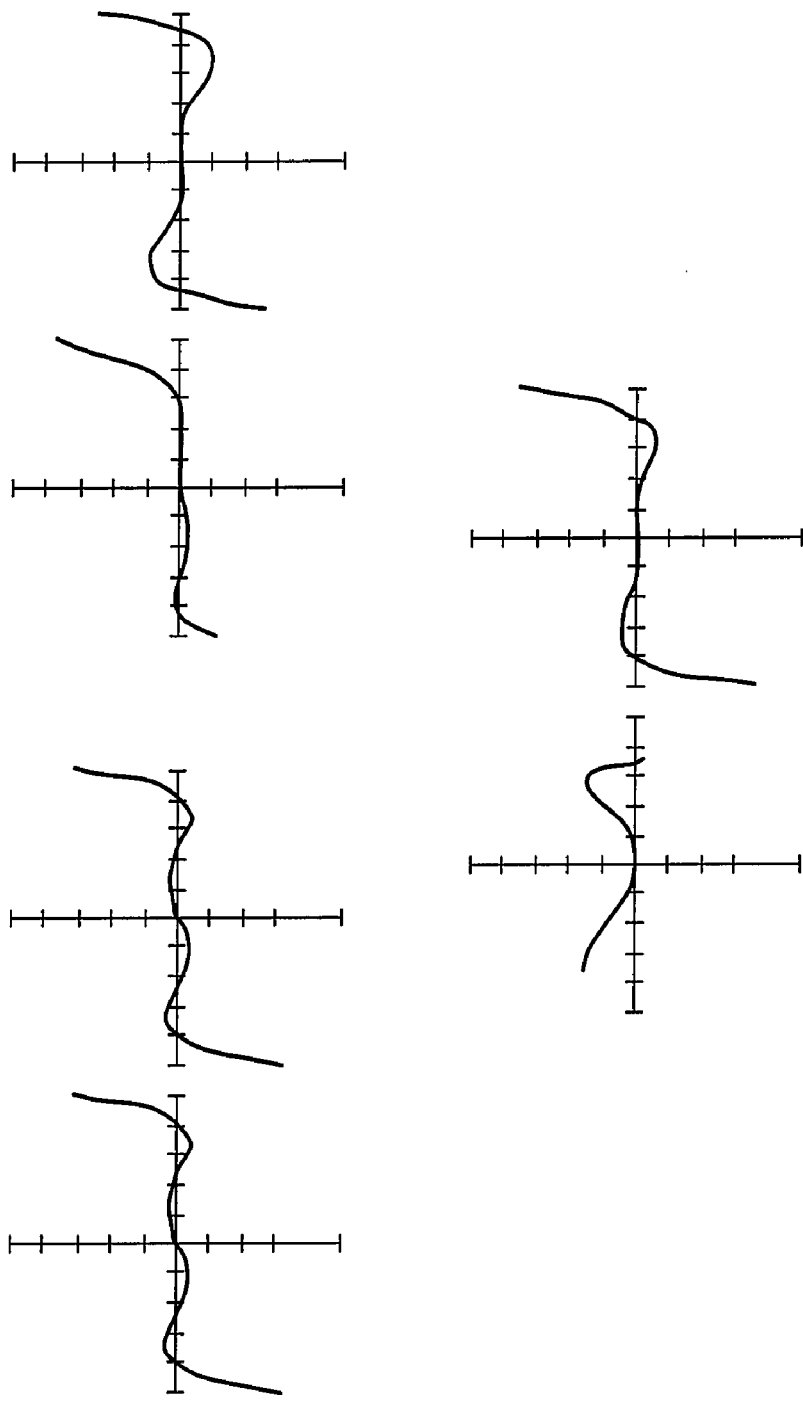

Referring to FIGS. 12A-12C, FIG. 12A is showing of the MTF. In FIG. 12A, when the spatial frequency is 50, the modulus of the OTF is still over 0.5, thus satisfying the specification of the standard. In addition, FIG. 12B is the field curve diagram and distortion diagram of images, and FIG. 12C is the transverse ray fan plot of images. Since graphics of FIGS. 12B and 12C are within the scope of the standard, the fixed-focus lens 600 of the present embodiment has preferable optical quality.

To sum up, the fixed-focus lens according to the present invention has at least one or more following advantages.

1. As the negative and positive refractive powers of the lens groups are used in combination, the aberration is eliminated effectively.

2. As the first lens group comprises an aspheric lens, the serious aberration caused by the wide-angle incident light is effectively corrected.

3. The fixed-focus lens of the present invention is an L-shaped lens. Therefore, the length is greatly reduced, and an RPTV using the fixed-focus lens of the present invention is thinner.

4. Compared with the conventional projection lens using eleven lenses, the fixed-focus lenses in the first to the fourth embodiments have fewer lenses, the material cost for lenses is saved, and the tolerance accumulation is reduced, thus improving the production yield and reducing the manufacturing cost.

5. By limiting the value of D/h to be over 0.176, the problem of ghost images is effectively eliminated.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A fixed-focus lens, suitable for projecting an image beam from a light valve onto a screen, comprising:
   a first lens group, disposed between the light valve and the screen, the first lens group having a negative refractive power and comprising:
      a first lens, having a negative refractive power, the first lens being an aspheric lens;
      a second lens, disposed between the first lens and the second lens group, and having a negative refractive power; and
      a third lens, disposed between the second lens and the second lens group, and having a negative refractive power;
   a second lens group, disposed between the first lens group and the light valve, the second lens group having a positive refractive power and comprising:
      a fourth lens, having a positive refractive power; and
   a third lens group, disposed between the second lens group and the light valve, the third lens group having a positive refractive power and comprising:
      a fifth lens, having a positive refractive power;
      a sixth lens, disposed between the fifth lens and the light valve, and having a negative refractive power;
      a seventh lens, disposed between the sixth lens and the light valve, and having a positive refractive power;
      an eighth lens, disposed between the seventh lens and the light valve, and having a negative refractive power; and
         a ninth lens, disposed between the eighth lens and the light valve, and having a positive refractive power;
      wherein the shortest distance between the first lens group and the second lens group is $S_{1\text{-}2}$, the effective focal length of the third lens group is $F_3$, and $S_{1\text{-}2}/F_3 > 1.51$, the effective focal length of the lens closest to the screen in the first lens group is $F_{11}$, the effective focal length of the fixed-focus lens is F, and $F_{11}F < -18.5$.

2. The fixed-focus lens as claimed in claim 1, wherein a part of the image beam from the light valve is reflected onto an active surface of the light valve by the fixed-focus lens and forms a light spot with a size of D on the active surface, the distance from the point, farthest away from an optical axis of the active surface, on the active surface to the intersection point of the active surface and the optical axis is h, and D/h>0.176.

3. The fixed-focus lens as claimed in claim 1, further comprising an aperture disposed between the second lens group and the third lens group.

4. The fixed-focus lens as claimed in claim 1, further comprising a reflective element disposed between the first lens group and the second lens group.

* * * * *